United States Patent
Le et al.

(10) Patent No.: US 10,742,892 B1
(45) Date of Patent: Aug. 11, 2020

(54) APPARATUS AND METHOD FOR CAPTURING AND BLENDING MULTIPLE IMAGES FOR HIGH-QUALITY FLASH PHOTOGRAPHY USING MOBILE ELECTRONIC DEVICE

(71) Applicant: Samsung Electronics Co., Ltd., Suwon-si, Gyeonggi-do (KR)

(72) Inventors: Long N. Le, Richardson, TX (US); Hamid R. Sheikh, Allen, TX (US); John W. Glotzbach, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/278,543

(22) Filed: Feb. 18, 2019

(51) Int. Cl.
*H04N 5/235* (2006.01)
*G06T 5/00* (2006.01)
(Continued)

(52) U.S. Cl.
CPC .......... *H04N 5/2354* (2013.01); *G06T 5/009* (2013.01); *G06T 5/40* (2013.01); *G06T 5/50* (2013.01);
(Continued)

(58) Field of Classification Search
CPC .............. H04N 5/2354; H04N 5/2256; H04N 5/23232; H04N 5/2352; H04N 5/2353;
(Continued)

(56) References Cited

U.S. PATENT DOCUMENTS 7,133,070 B2 * 11/2006 Wheeler .................. H04N 1/40
348/223.1
7,428,378 B1 * 9/2008 Warpakowski Furlan ..................
G03B 7/16
396/157
(Continued)

FOREIGN PATENT DOCUMENTS

JP  2007228099 A  9/2007
JP  2012119840 A  6/2012
(Continued)

OTHER PUBLICATIONS

Zhen et al., "System and Method for Compositing High Dynamic Range Images", U.S. Appl. No. 16/277,630 filed Feb. 15, 2019, 52 pages.
(Continued)

*Primary Examiner* — Chiawei Chen

(57) ABSTRACT

A method includes capturing multiple ambient images of a scene using at least one camera of an electronic device and without using a flash of the electronic device. The method also includes capturing multiple flash images of the scene using the at least one camera of the electronic device and during firing of a pilot flash sequence using the flash. The method further includes analyzing multiple pairs of images to estimate exposure differences obtained using the flash, where each pair of images includes one of the ambient images and one of the flash images that are both captured using a common camera exposure and where different pairs of images are captured using different camera exposures. In
(Continued)

addition, the method includes determining a flash strength for the scene based on the estimate of the exposure differences and firing the flash based on the determined flash strength.

20 Claims, 14 Drawing Sheets

(51) Int. Cl.
    *G06T 5/40*      (2006.01)
    *G06T 5/50*      (2006.01)

(52) U.S. Cl.
    CPC . *H04N 5/2351* (2013.01); *G06T 2207/20208* (2013.01); *G06T 2207/20216* (2013.01)

(58) Field of Classification Search
    CPC ........ H04N 1/6086; G03B 15/05; G03B 7/16; G06T 5/50; G06T 2207/10152
    See application file for complete search history.

(56) References Cited

U.S. PATENT DOCUMENTS

| | | | |
|---|---|---|---|
| 7,443,443 B2 | 10/2008 | Raskar et al. | |
| 7,852,379 B2 * | 12/2010 | Aoki | H04N 5/23232 348/222.1 |
| 7,962,030 B2 | 6/2011 | Trevelyan | |
| 8,018,525 B2 | 9/2011 | Trevelyan et al. | |
| 8,953,094 B2 | 2/2015 | Baer | |
| 9,081,257 B2 | 7/2015 | Miyazaki | |
| 9,438,809 B2 | 9/2016 | Sheikh et al. | |
| 9,456,144 B2 | 9/2016 | Miyazaki | |
| 9,571,745 B2 | 2/2017 | Mahowald | |
| 10,097,765 B2 | 10/2018 | Sheikh et al. | |
| 10,554,890 B1 * | 2/2020 | Le | G06T 5/50 |
| 2002/0113882 A1 * | 8/2002 | Pollard | H04N 1/00835 348/239 |
| 2004/0145674 A1 | 7/2004 | Hoppe et al. | |
| 2004/0234259 A1 * | 11/2004 | Muramatsu | G03B 15/05 396/157 |
| 2006/0008171 A1 * | 1/2006 | Petschnigg | G06T 5/50 382/254 |
| 2007/0025717 A1 * | 2/2007 | Raskar | G03B 15/03 396/155 |
| 2007/0025720 A1 * | 2/2007 | Raskar | G03B 7/16 396/213 |
| 2007/0146529 A1 * | 6/2007 | Suzuki | H04N 5/2352 348/333.01 |
| 2007/0201853 A1 * | 8/2007 | Petschnigg | G03B 15/03 396/155 |
| 2007/0263099 A1 * | 11/2007 | Motta | H04N 5/2354 348/222.1 |
| 2007/0264000 A1 | 11/2007 | Hsieh et al. | |
| 2008/0079842 A1 * | 4/2008 | Aoki | H04N 5/23232 348/366 |
| 2008/0106636 A1 | 5/2008 | Wernersson | |
| 2008/0181597 A1 * | 7/2008 | Tamura | G03B 15/05 396/164 |
| 2008/0199172 A1 * | 8/2008 | Hamada | G03B 7/16 396/157 |
| 2010/0165178 A1 * | 7/2010 | Chou | G03B 13/32 348/371 |
| 2010/0328486 A1 | 12/2010 | Steinberg et al. | |
| 2011/0157412 A1 * | 6/2011 | Yoshida | H04N 9/735 348/223.1 |
| 2013/0278819 A1 * | 10/2013 | Liaw | G03B 7/16 348/370 |
| 2013/0329015 A1 * | 12/2013 | Pulli | H04N 13/239 348/47 |
| 2015/0098014 A1 * | 4/2015 | Raskar | H04N 5/2354 348/371 |
| 2015/0229819 A1 * | 8/2015 | Rivard | H04N 5/2354 348/362 |
| 2016/0323518 A1 * | 11/2016 | Rivard | H04N 5/247 |
| 2017/0201692 A1 | 7/2017 | Wu | |
| 2017/0343887 A1 * | 11/2017 | Hoshino | H04N 5/2256 |
| 2018/0137375 A1 * | 5/2018 | Takemura | H04N 7/18 |
| 2019/0149706 A1 * | 5/2019 | Rivard | H04N 5/2355 348/371 |

FOREIGN PATENT DOCUMENTS

| | | |
|---|---|---|
| JP | 2016019196 A | 2/2016 |
| JP | 6333095 B2 | 5/2018 |
| KR | 20160127606 A | 11/2016 |

OTHER PUBLICATIONS

Le et al., "Apparatus and Method for Generating Low-Light Images With Improved Bokeh Using Mobile Electronic Device", U.S. Appl. No. 16/278,581, filed Feb. 18, 2019, 52 pages.

International Search Report and Written Opinion of the International Searching Authority in connection with International Patent Application No. PCT/KR2019/008150 dated Nov. 15, 2019, 25 pages.

* cited by examiner

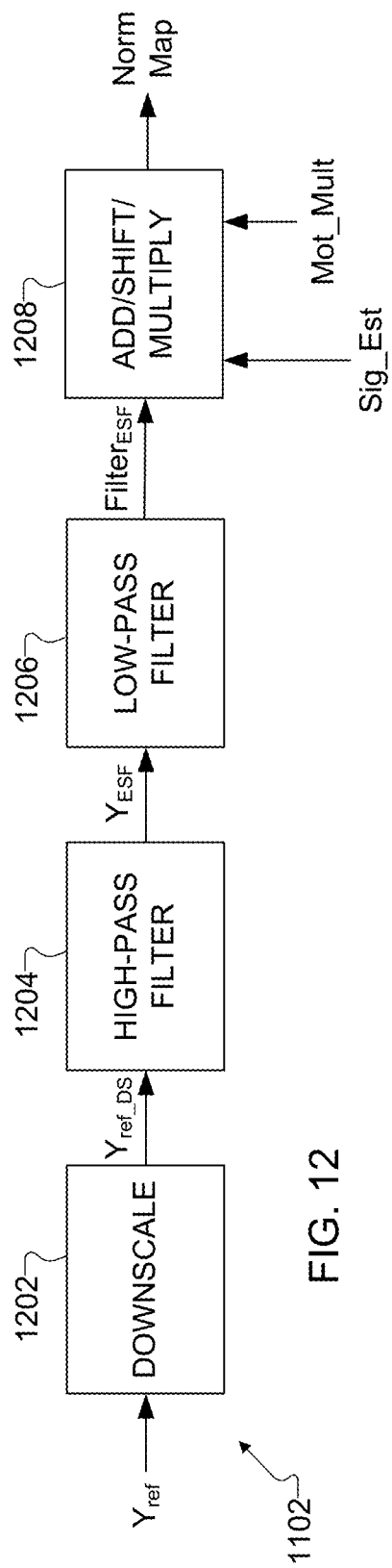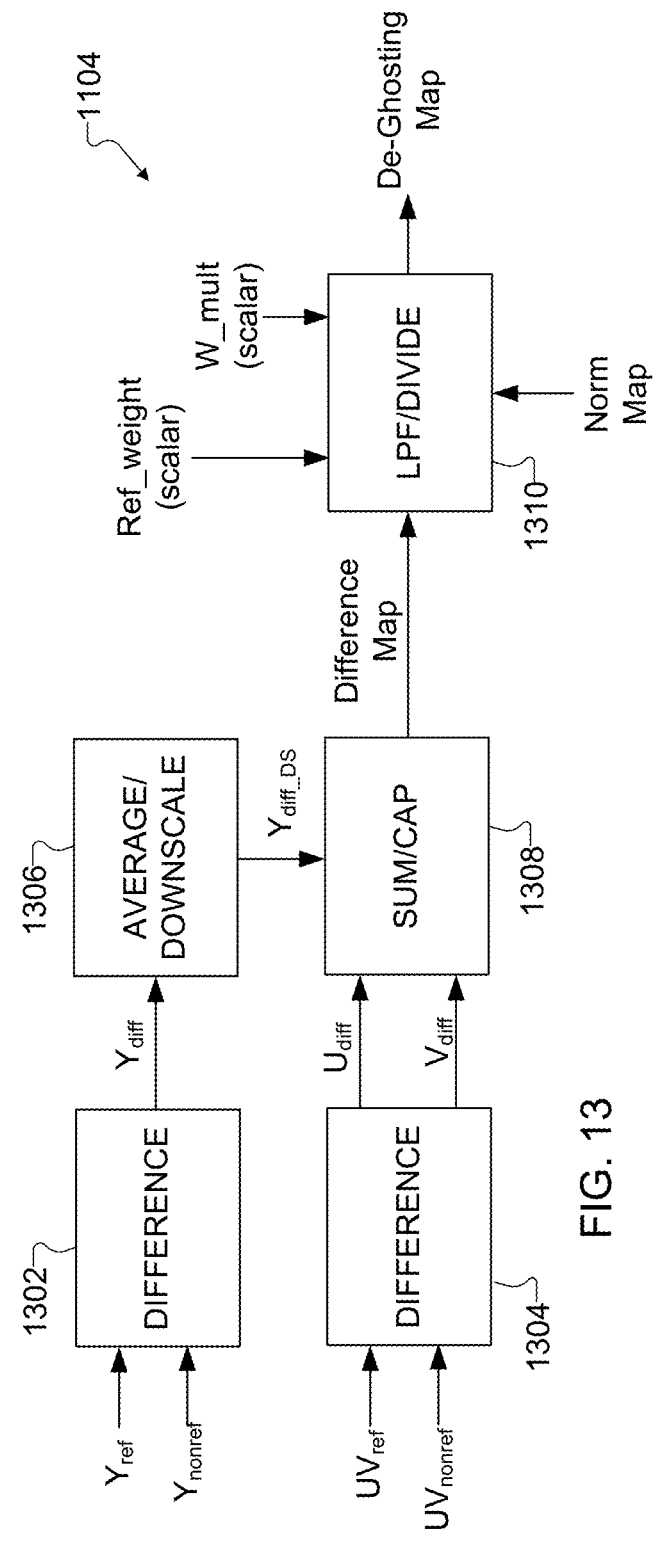
FIG. 12
FIG. 13

1800

1900

APPARATUS AND METHOD FOR CAPTURING AND BLENDING MULTIPLE IMAGES FOR HIGH-QUALITY FLASH PHOTOGRAPHY USING MOBILE ELECTRONIC DEVICE

TECHNICAL FIELD

This disclosure relates generally to image capturing systems. More specifically, this disclosure relates to an apparatus and method for capturing and blending multiple images for high-quality flash photography using a mobile electronic device.

BACKGROUND

Many mobile electronic devices, such as smartphones and tablet computers, include cameras that can be used to capture still and video images. While convenient, cameras on mobile electronic devices typically suffer from a number of shortcomings, including poor performance in low-light situations. For example, some mobile electronic devices simply use a flash when capturing low-light images. However, the flashes used in mobile electronic devices typically act as point sources of bright light (not diffuse sources of light), so the use of a flash typically causes over-exposure or "blow out" for nearby people or objects and under-exposure of the background. In other words, the use of a flash creates non-uniform radiance in the images, resulting in low aesthetic quality. The captured images also tend to have a bluish cast, which is not constant across the images and therefore not easily removable. Other mobile electronic devices attempt to combine multiple images together to produce more aesthetically-pleasing images. However, these approaches often suffer from unnatural saturation artifacts, ghosting artifacts, color twisting, bluish color casts, or noise.

SUMMARY

This disclosure provides an apparatus and method for capturing and blending multiple images for high-quality flash photography using a mobile electronic device.

In a first embodiment, a method includes capturing multiple ambient images of a scene using at least one camera of an electronic device and without using a flash of the electronic device. The method also includes capturing multiple flash images of the scene using the at least one camera of the electronic device and during firing of a pilot flash sequence using the flash. The method further includes analyzing multiple pairs of images to estimate exposure differences obtained using the flash, where each pair of images includes one of the ambient images and one of the flash images that are both captured using a common camera exposure and where different pairs of images are captured using different camera exposures. In addition, the method includes determining a flash strength for the scene based on the estimate of the exposure differences and firing the flash based on the determined flash strength.

In a second embodiment, an electronic device includes at least one camera, a flash, and at least one processing device. The at least one processing device is configured to capture multiple ambient images of a scene using the at least one camera and without using the flash. The at least one processing device is also configured to capture multiple flash images of the scene using the at least one camera and during firing of a pilot flash sequence using the flash. The at least one processing device is further configured to analyze multiple pairs of images to estimate exposure differences obtained using the flash, where each pair of images includes one of the ambient images and one of the flash images that are both captured using a common camera exposure and where different pairs of images are captured using different camera exposures. In addition, the at least one processing device is configured to determine a flash strength for the scene based on the estimate of the exposure differences and fire the flash based on the determined flash strength.

In a third embodiment, a non-transitory machine-readable medium contains instructions that when executed cause at least one processor of an electronic device to capture multiple ambient images of a scene using at least one camera of the electronic device and without using a flash of the electronic device. The medium also contains instructions that when executed cause the at least one processor of the electronic device to capture multiple flash images of the scene using the at least one camera of the electronic device and during firing of a pilot flash sequence using the flash. The medium further contains instructions that when executed cause the at least one processor of the electronic device to analyze multiple pairs of images to estimate exposure differences obtained using the flash, where each pair of images includes one of the ambient images and one of the flash images that are both captured using a common camera exposure and where different pairs of images are captured using different camera exposures. In addition, the medium contains instructions that when executed cause the at least one processor of the electronic device to determine a flash strength for the scene based on the estimate of the exposure differences and fire the flash based on the determined flash strength.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments thereof, but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 9, 10, 11, 12, and 13 illustrate an example process for an image de-ghosting operation in the process of FIG. 5 in accordance with this disclosure;

DETAILED DESCRIPTION

FIGS. 1 through 21, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices suffer from a number of shortcomings, including poor performance in low-light situations. Some mobile electronic devices simply use a flash for capturing low-light images, which typically results in non-uniform radiance and low aesthetic quality. Other mobile electronic devices attempt to combine multiple images together to produce more aesthetically-pleasing images but suffer from problems such as unnatural saturation artifacts, ghosting artifacts, color twisting, bluish color casts, or noise.

This disclosure provides techniques for using multiple images captured using a flash by combining principles of multi-frame high dynamic range (HDR) imaging, where camera exposure settings are adjusted to capture multiple images in the presence of the flash. This is accomplished by analyzing pairs of images captured by an electronic device to determine how to control a flash of the electronic device. Multiple images are then captured by the electronic device based on the flash control, and those images are processed and blended to produce a final image having a more uniform radiance. This may allow, for example, more aesthetically-pleasing images having more natural colors in low-light situations to be produced. These images may suffer from little or no blow-out and may have backgrounds and foregrounds that are more evenly illuminated. These images may also suffer from less saturation artifacts, ghosting artifacts, color twisting, bluish color casts, or noise.

Figure 1:
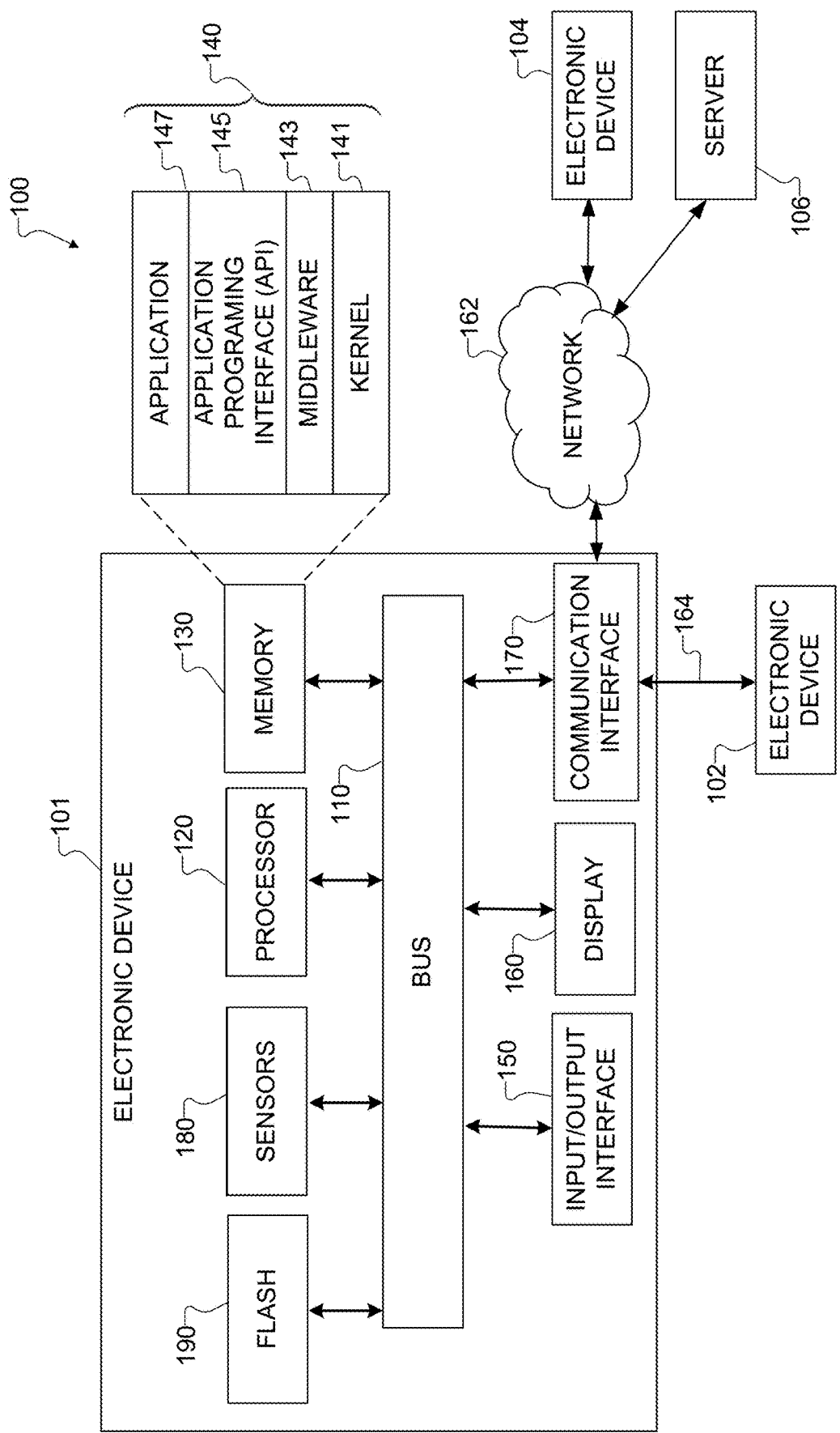
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network environment 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera during a capture event. The processor 120 can process the image data (as discussed in more detail below) to perform multi-pair image analysis and multi-scale blending.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electro-myography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101. The one or more cameras can capture images as discussed below and are used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106).

Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
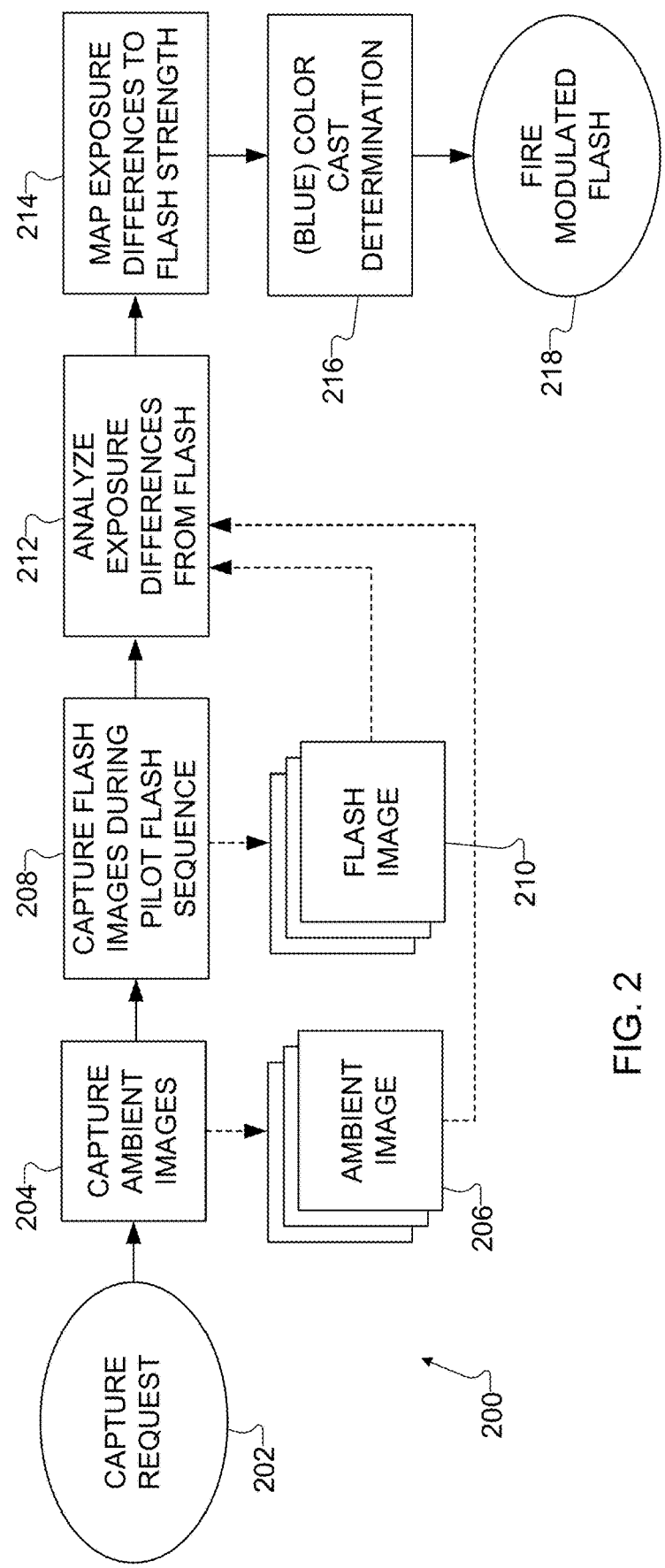
FIG. 2 illustrates an example process for multi-pair image analysis for flash control in a mobile electronic device in accordance with this disclosure.

FIG. 2 illustrates an example process 200 for multi-pair image analysis for flash control in a mobile electronic device in accordance with this disclosure. For ease of explanation, the process 200 shown in FIG. 2 is described as being performed using the electronic device 101 of FIG. 1. However, the process 200 shown in FIG. 2 could be used with any other suitable electronic device and in any suitable system.

The process 200 is generally used to identify and make intelligent adjustments to the flash strength of the flash 190 and possibly other parameters such as camera exposure and number of frames. The flash strength and optionally the other parameters that are identified using the process 200 can then be used as described below to support multi-scale blending of images (which is described with respect to FIG. 5). The flash strength is identified here using pilot flash scene analysis/subject detection. A pilot flash sequence generally refers to one or more flashes that occur prior to the main flash used to produce a final image of a scene. A pilot flash sequence is often used in electronic devices for other purposes as well, such as red-eye reduction, and may include a single flash or multiple flashes. The scene analysis/subject detection can be used to identify object types in a scene, a distance to a closest object, a scene type (such as indoor or outdoor, night or day, or macro or wide-angle), or other characteristics of the scene. The determined flash strength and optionally the other parameters are determined using this information.

As shown in FIG. 2, a capture request 202 is received by the electronic device 101. The capture request 202 represents any suitable command or input indicating a need or desire to capture an image of a scene using the electronic device 101. For example, the capture request 202 could be initiated in response to a user's pressing of a "soft" button presented on the display 160 or the user's pressing of a "hard" button. In response to the capture request 202, the processor 120 performs a capture operation 204 using the camera of the electronic device 101 to capture multiple ambient images 206 of the scene. An ambient image generally refers to an image of a scene in which little or no light from the electronic device 101 is illuminating the scene, so the flash 190 may not be used in the capture of the ambient images 206. In some instances, during the capture operation 204, the processor 120 can control the camera of the electronic device 101 so that the ambient images 206 are captured rapidly in a burst mode. Different ambient images 206 can be captured using different camera exposures.

In response to the capture request 202, the processor 120 also performs a capture operation 208 using the camera of the electronic device 101 to capture multiple flash images 210 of the scene. A flash image generally refers to an image of a scene in which light from the electronic device 101 is illuminating the scene, so the flash 190 is used in the capture of the flash images 210. In some instances, during the capture operation 208, the processor 120 can control the camera of the electronic device 101 so that the flash images 210 are captured rapidly in a burst mode. The flash 190 is used here to generate the pilot flash sequence, and the flash images 210 may be captured using a common flash strength. The flash strength used here may denote a default flash strength or other flash strength used by the camera or the electronic device 101. Different flash images 210 can be captured using different camera exposures.

In this example, the ambient images 206 and the flash images 210 form multiple ambient-flash image pairs. That is, the processor 120 can control the camera so that multiple pairs of images are obtained, where each pair includes one ambient image 206 captured without using the flash 190 and one flash image 210 captured using the flash 190. Each image pair can be captured using a common camera exposure and camera sensitivity (ISO setting), and different image pairs can be captured using different camera exposures or camera sensitivities. It should be noted, however, that there is no need to capture the images in each image pair consecutively. The ambient images 206 and the flash images 210 can be captured in any suitable order, as long as the processor 120 obtains multiple ambient-flash image pairs.

The images 206 and 210 are used by the processor 120 in an analysis operation 212 to identify the exposure differences that are obtained in the scene using the flash 190. The analysis operation 212 occurs in order to quantify the exposure differences that are obtained using the flash 190 and the different camera exposures/camera sensitivities. In this way, the analysis operation 212 can identify the exposure differences between ambient lighting and flash lighting in a scene, which could occur in any suitable manner (such as at the pixel level in the images or for the foreground or one or more objects in the images). This information can then be used to identify the ideal or desired flash strength for capturing an image of the scene. This information can also be used to perform other functions, such as color correction. The analysis operation 212 includes any suitable operations to identify exposure differences between images. Two example implementations of the analysis operation 212 are described below, although other implementations of the analysis operation 212 could also be used. One benefit of using multiple pairs of ambient/flash images is that the resulting analysis is more robust to over-exposed and under-exposed regions of the images, yielding a more accurate estimate of the exposure differences from the use of the flash 190.

The exposure differences identified by the analysis operation 212 are used by the processor 120 during a mapping operation 214 to map the exposure differences to a suitable flash strength. The mapping here essentially translates the exposure differences into a suitable strength for the flash 190 to be used when capturing subsequent images of the scene. Here, the mapping can consider various aspects of the exposure differences, such as sizes of foreground regions/objects in the scene and the sizes of background regions in the scene. The mapping can also consider the types of objects in the scene, such as whether the scene appears to include at least one person or one or more inanimate objects. The mapping can further be based on an estimated distance to the closest object in the scene. In addition, the mapping can be based on whether the image is being captured indoors or outdoors, at night or during the day, or using a macro lens or a wide-angle lens. The specific mappings used can vary based on a number of circumstances, such as the design of the camera being used in the electronic device 101.

The identified flash strength can optionally be used by the processor 120 during a color cast determination operation 216. During this operation 216, the processor 120 attempts to estimate the regions of any subsequent images where blue casting or other color casting may form as a result of the use of the flash 190 at the identified flash strength. This information can be useful in later processing of the subsequent images to remove the casting from the subsequent images. The identification of the regions performed here can be based on the exposure differences identified by the analysis operation 212 and can identify the likely areas where casting may occur based on the exposure differences.

A modulated flash firing 218 occurs using the identified flash strength. For example, when the processor 120 is ready to capture additional images of the scene in order to produce a final image of the scene, the processor 120 can trigger the flash 190. The additional images of the scene are then captured by the camera of the electronic device 101 while the scene is being illuminated using the flash 190, which operates at the identified flash strength. Ideally, the use of the identified flash strength allows the additional images to then be blended or otherwise processed to provide a more uniform illumination in the final image of the scene.

Figure 3:
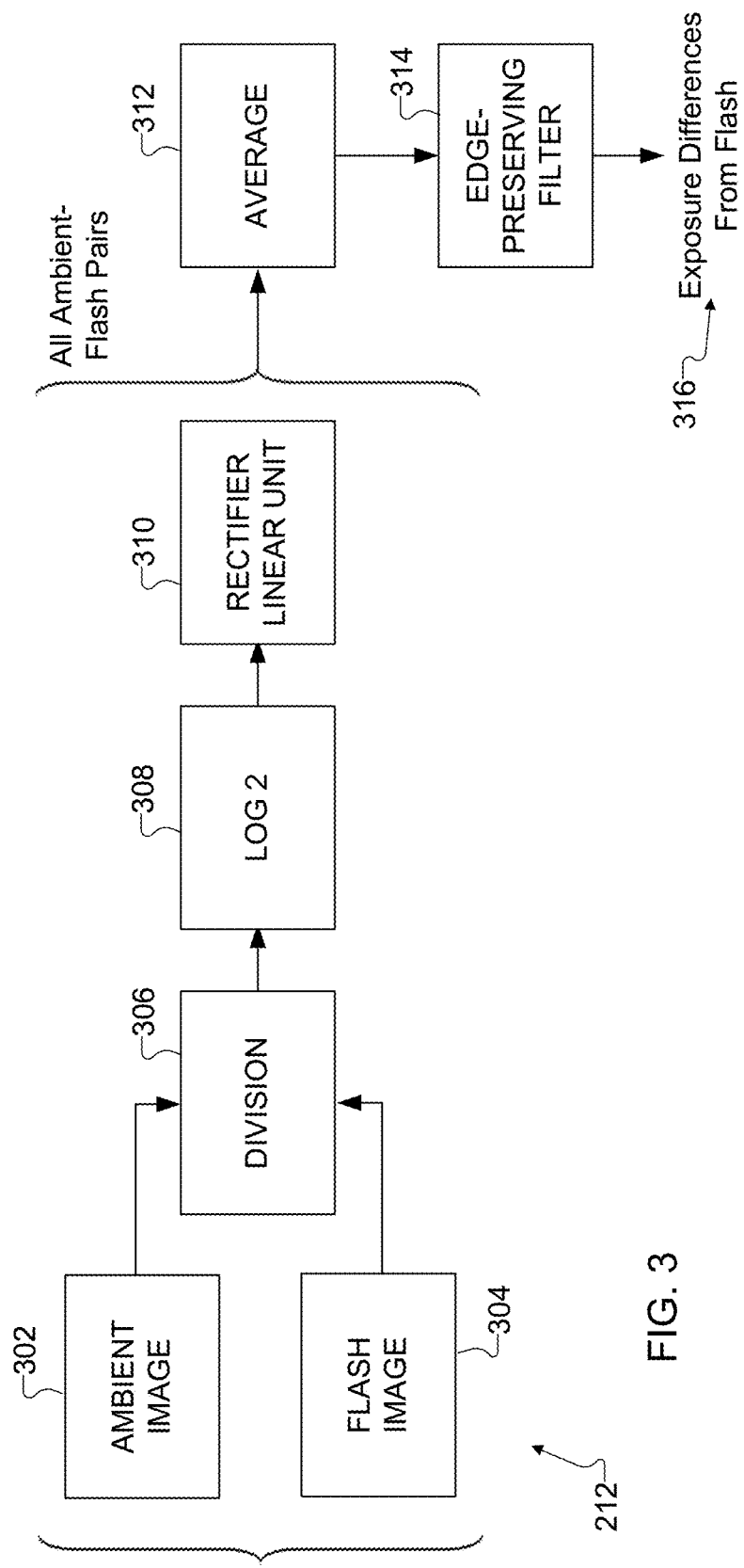
FIGS. 3 and 4 illustrate example analysis operations for analyzing exposure differences in the process of FIG. 2 in accordance with this disclosure.
Figure 4:
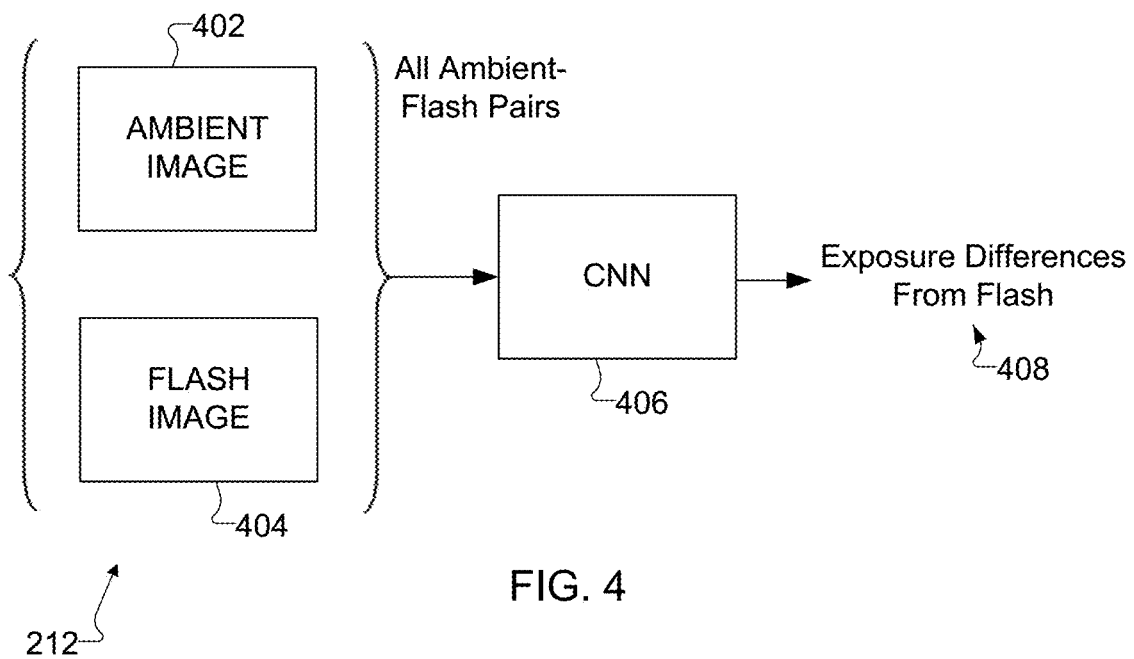

FIGS. 3 and 4 illustrate example analysis operations 212 for analyzing exposure differences in the process 200 of FIG. 2 in accordance with this disclosure. In particular, FIG. 3 illustrates an example implementation of the analysis operation 212 in which the analysis is performed using a prior model on a per-pixel basis, and FIG. 4 illustrates an example implementation of the analysis operation 212 in which the analysis is performed using artificial intelligence. Of course, other implementations of the analysis operation 212 are also possible and fall within the scope of this disclosure.

As shown in FIG. 3, two images 302 and 304 in an image pair are being analyzed. The images here include one ambient image 302 (representing one of the images 206) and one flash image 304 (representing one of the images 210). The images 302 and 304 are subject to a division operation 306, which divides the value of each pixel in one image 302 or 304 by the value of the corresponding pixel in the other image 304 or 302. The quotient values resulting from the division are subjected to a logarithmic operation 308 (a log 2 operation in this example) to convert the quotient values into the logarithmic domain. A rectifier linear unit 310 operates to prevent the values in the logarithmic domain from being negative, such as by selecting (for each value in the logarithmic domain) the greater of that value or zero. The operations 306, 308, and 310 here can be performed for each pair of ambient/flash images captured by the electronic device 101 during the capture operations 204 and 208.

Because the ambient/flash images can be captured by the electronic device 101 using different camera exposures and/or camera sensitivities, different images may often have resulting data that is reliable in some areas and not reliable in other areas. The data resulting from the operations 306, 308, and 310 for the different pairs of ambient/flash images can therefore be averaged in an averaging operation 312, which averages the values obtained for the different camera exposures/camera sensitivities. The averaged values are passed through an edge-preserving filter 314, which smooths out the averaged data and reduces noise while preserving edges within the averaged data. The edges could denote the edges of one or more people or objects in the foreground of the images or in the background of the images. Various types of edge-preserving filters are known in the art. In some embodiments, the edge-preserving filter 314 could represent a bilateral filter, which operates to replace the intensity of each average pixel with a weighted average of intensity values from nearby average pixels. Note, however, that other implementations of the edge-preserving filter 314 could be used.

The outputs of the edge-preserving filter 314 are the exposure differences 316 obtained through the use of the flash 190. The exposure differences could be expressed in any suitable manner. In some embodiments, for example, the exposure differences can be expressed as a grayscale image, where darker pixels in the grayscale image identify areas where the exposure differences were smaller and brighter pixels in the grayscale image identify areas where the exposure differences were larger. For instance, if the original ambient and flash images 206 and 210 included a person in the foreground and a dark background, the grayscale image would likely include many white pixels in the area of the images where the person was located, since the illumination from the flash 190 would greatly improve the brightness of the person in the flash images. In contrast, the grayscale image would likely include many dark pixels in the area of the images where the background was located, since the illumination from the flash 190 may not improve (or would only slightly improve) the brightness of the background in the flash images.

As shown in FIG. 4, once again, two images 402 and 404 of each image pair are analyzed. In this example, however, the pairs of images 402 and 404 are passed through a convolutional neural network (CNN) 406. A convolutional neural network 406 generally represents a type of deep artificial neural network, and convolutional neural networks are often applied to analyzing images. In the convolutional neural network 406, layers of convolutional neurons apply a convolution operation that emulates the response of individual neurons to visual stimuli. Each neuron typically applies some function to its input values (often by weighting different input values differently) to generate output values. Pooling layers can be used to combine the output values of neuron clusters from one layer into input values for single neurons in another layer.

The convolutional neural network 406 here can be used to process the image pairs and generate exposure differences (such as in the form of a grayscale image). This can be accomplished by training the convolutional neural network 406 so that the weights of the neurons have appropriate values. The convolutional neural network 406 can also be trained to perform other functions, such as specularity removal (the removal of small bright spots where distant specular surfaces in the background might still yield a strong response to a flash) and de-ghosting (the removal of movement from one image to another).

Although FIG. 2 illustrates one example of a process 200 for multi-pair image analysis for flash control in a mobile electronic device and FIGS. 3 and 4 illustrate examples of analysis operations 212 for analyzing exposure differences in the process 200 of FIG. 2, various changes may be made to FIGS. 2, 3, and 4. For example, while shown as sequences of steps, various operations shown in FIGS. 2, 3, and 4 could overlap, occur in parallel, occur in a different order, or occur any number of times. As a particular example, the operations 204 and 208 in FIG. 2 could be reversed or interleaved so that the ambient images 206 and the flash images 210 are captured in a different order than that shown here. Also, the specific analyses shown in FIGS. 3 and 4 are examples only, and other techniques could be used to identify exposure differences involving any number of images.

Figure 5:
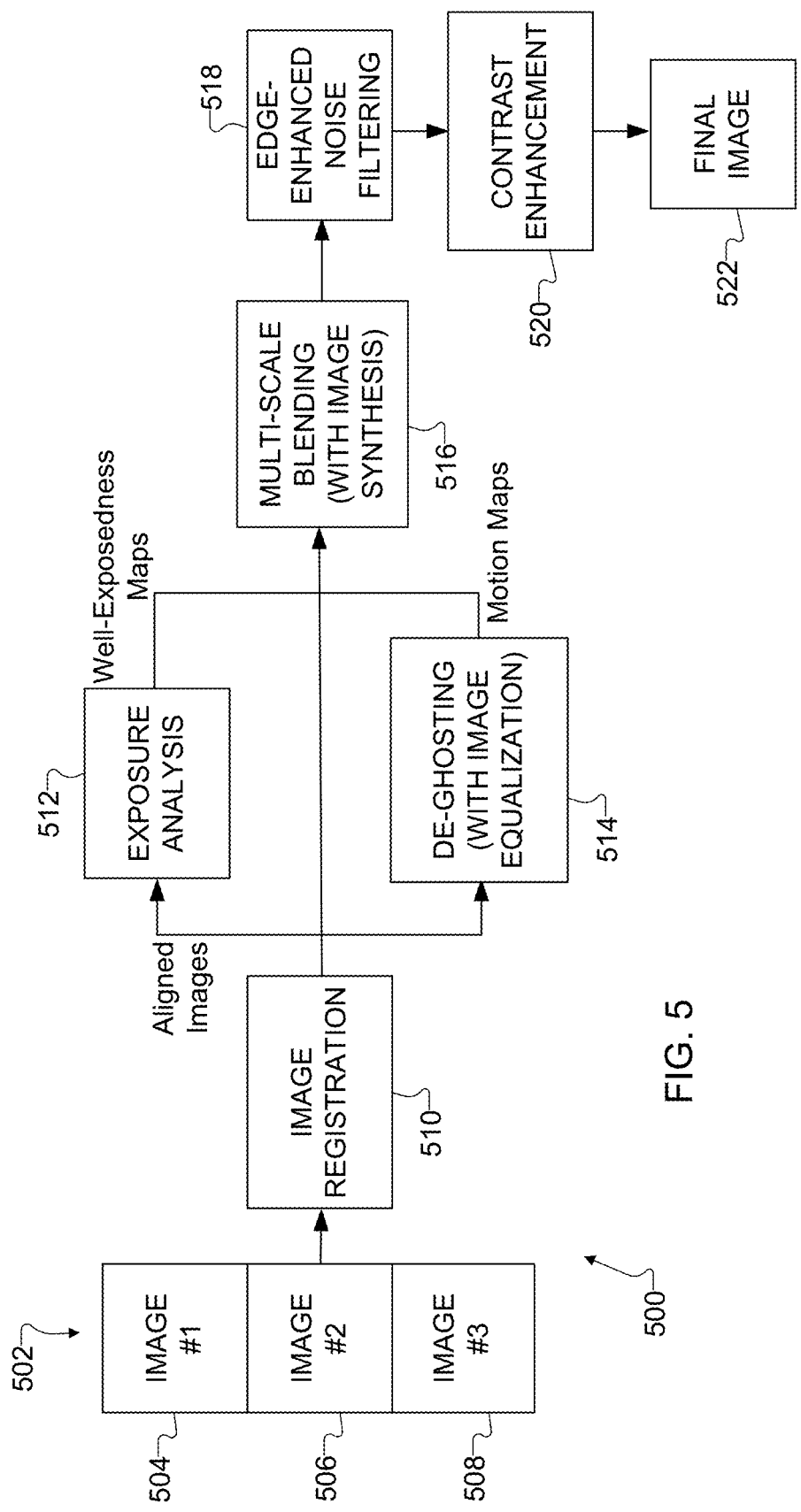
FIG. 5 illustrates an example process for multi-scale blending of images in a mobile electronic device in accordance with this disclosure.

FIG. 5 illustrates an example process 500 for multi-scale blending of images in a mobile electronic device in accordance with this disclosure. For ease of explanation, the process 500 shown in FIG. 5 is described as being performed using the electronic device 101 of FIG. 1. However, the process 500 shown in FIG. 5 could be used with any other suitable electronic device and in any suitable system.

The process 500 is generally used to capture multiple images of a scene using different camera exposures at the same flash strength, namely the flash strength determined using the process 200 described above. In some embodiments, the different camera exposures can be achieved by varying the camera's sensor gain and exposure time. Generally, the electronic device 101 can capture one or more images having shorter exposures, one or more images having longer exposures, and optionally one or more images having mid-range exposures between the shorter and longer exposures. The images are then aligned geometrically and photometrically, and one of the images (often a mid- or longer-exposure image) is selected as a reference. The images are blended to, among other things, replace one or more blown-out regions in the reference image with one or more regions based on or extracted from other images (often the shorter-exposure images). Motion in the images can also be estimated in order to remove ghosting artifacts, and other processing can occur to improve the final image of the scene.

As shown in FIG. 5, a collection 502 of images is captured using the camera of the electronic device 101. Here, the collection 502 includes at least three images 504, 506, and 508, each of which can be captured using a different exposure but a common flash strength. For example, the image 504 could be captured using the shortest exposure, the image 508 could be captured using the longest exposure, and the image 506 could be captured using an intermediate exposure between the shortest and longest exposures. Note, however, that other numbers of images (including two images or more than three images) could be captured and other numbers of exposures (including two exposures or more than three exposures) could be used. One or multiple images could be captured at each exposure, and there is no requirement that an equal number of images be captured per exposure.

The image collection 502 is provided to an image registration operation 510, which generally operates to align the images 504, 506, and 508. Alignment may be needed if the electronic device 101 moves or rotates in between image captures and causes objects in the images to move or rotate slightly, which is common with handheld devices. The images 504, 506, and 508 here can be aligned both geometrically and photometrically. In some embodiments, the image registration operation 510 can use global Oriented FAST and Rotated BRIEF (ORB) features as local features and global features from a block search to align the images. One example implementation of the image registration operation 510 is described below, although other implementations of the image registration operation 510 could also be used.

The aligned images are output and processed using an exposure analysis operation 512 and a de-ghosting operation 514. The exposure analysis operation 512 analyzes the aligned images to generate well-exposedness maps for the aligned images. Each well-exposedness map generally identifies the area or areas of one of the aligned images that are well-exposed (not over-exposed or under-exposed). Different metrics can be used to define the well-exposed portions of the images based on the camera exposures used to capture those images. For instance, different metrics can be defined by different functions, where the functions convert pixel values into well-exposedness values and where the functions are applied to different aligned images. One example implementation of the exposure analysis operation 512 is described below, although other implementations of the exposure analysis operation 512 could also be used.

The de-ghosting operation 514 processes the aligned images to identify motion occurring in the images, such as people or objects moving within the images. In some embodiments, the de-ghosting operation 514 divides each of the aligned images into tiles, such as sixteen tiles arranged in a four-by-four grid. The de-ghosting operation 514 then processes the tiles to identify motion, where the motion is identified as differences between the tiles. In this way, the de-ghosting operation 514 generates motion maps to identify areas in the images where motion is occurring. For instance, each motion map could include black pixels indicating where no motion is detected and white pixels indicating where motion is detected. The de-ghosting operation 514 can also equalize the images to account for the different camera exposures/camera sensitivities used to capture the images. One example implementation of the de-ghosting operation 514 is described below, although other implementations of the de-ghosting operation 514 could also be used.

A multi-scale image blending operation 516 receives the aligned images, the well-exposedness maps, and the motion maps and uses this information to generate one or more blended images. Each blended image can include or be based on portions of different images. For example, a blended image could be formed by selecting one of the images (such as an image 506 captured with an intermediate exposure) as a reference image and replacing blown-out or other portions of the reference image using or based on corresponding portions from other images. As a particular example, over-exposed portions of the image 506 can typically be replaced with or using corresponding portions of the image 504 when the image 504 is captured using a shorter exposure. The blending can also account for motion in the images, such as by avoiding the insertion of a moving object from one image in the wrong position in the reference image. In some embodiments, the blending represents a weighted blending of synthesized images across multiple scales, where blending maps are used as the weights and are based on a composite of the well-exposedness maps and de-ghosting maps. For instance, each of the blending maps could represent a product of one of the well-exposedness maps and one of the de-ghosting maps. One example implementation of the multi-scale blending operation 516 is described below, although other implementations of the multi-scale blending operation 516 could also be used.

Each blended image can then be subjected to one or more post-processing operations in order to improve the blended image. For example, the blended image can be subjected to an edge-enhanced noise filtering function 518, which generally operates to remove noise and improve the appearances of edges in the blended image. Various techniques for edge enhancement and noise filtering are known in the art. In some embodiments, the filtering function 518 can represent a multi-scale de-noising process that is guided by the blending maps, well-exposedness maps, and de-ghosting maps. The filtered blended image can be processed by a contrast enhancement operation 520, which generally operates to increase the overall contrast of the blended image while maintaining natural hue within the blended image. One example implementation of the contrast enhancement operation 520 is described below, although other implementations of the contrast enhancement operation 520 could also be used.

The output of the process 500 is at least one final image 522 of the scene. The final image 522 generally represents a blend of the original images 504, 506, and 508 after processing. As noted above, for example, the final image 522 may represent the image selected as the reference image (such as the image 506), with one or more portions of the reference image (such as one or more blown-own regions) replaced or combined with one or more corresponding portions of at least one other image (such as the shorter-exposure image 504). Ideally, the final image 522 has both a foreground and a background with more uniform illumination. The illumination need not be completely uniform, but the illumination in the final image 522 is more uniform compared to the illumination in at least the reference image.

Figure 6:
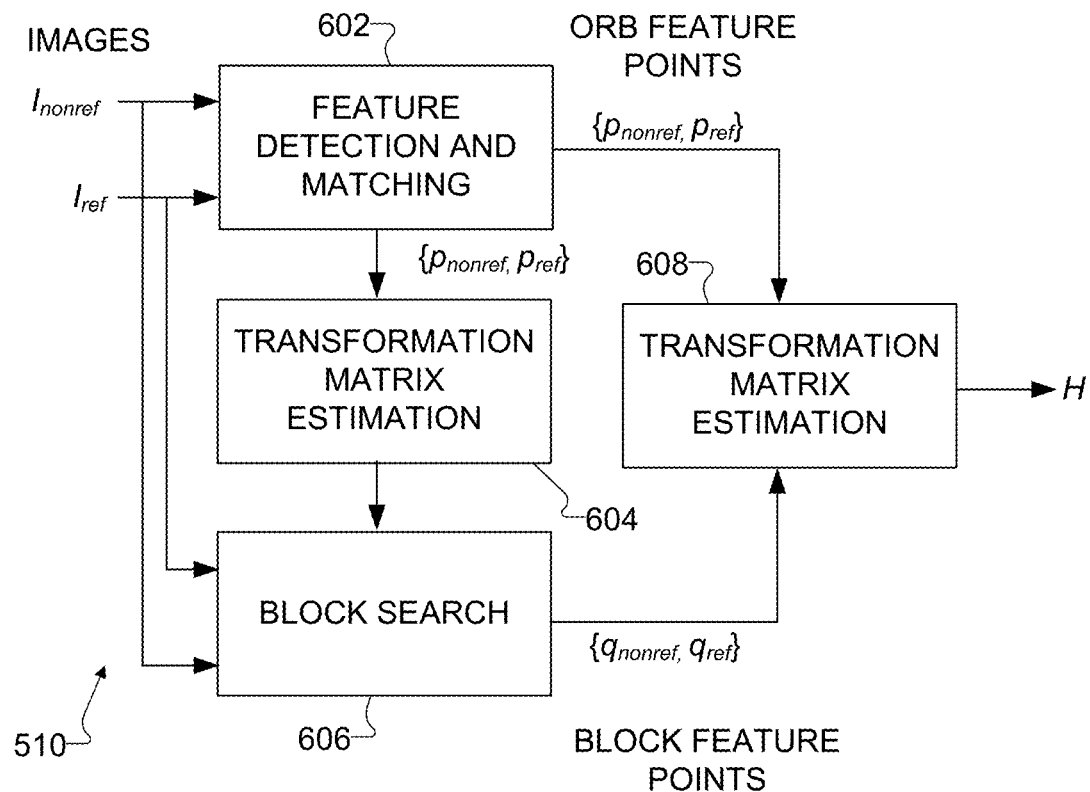
FIG. 6 illustrates an example process for an image registration operation in the process of FIG. 5 in accordance with this disclosure.

FIG. 6 illustrates an example process for an image registration operation 510 in the process 500 of FIG. 5 in accordance with this disclosure. As described above, the image registration operation 510 is used to align multiple images (such as the images 504, 506, and 508) captured by the electronic device 101. In FIG. 6, multiple images, namely a reference image and a non-reference image, are aligned by fitting a transformation matrix H to matched feature points. A pair of matched feature points represents a feature point in one image that is matched to a corresponding feature in the other image. Overall, this helps to compensate for movement of the camera/electronic device 101.

As shown in FIG. 6, a reference image $I_{ref}$ and a non-reference image $I_{nonref}$ are provided to a feature detection and matching function 602, which generally operates to identify the feature points in each image and match the feature points common to both images. In this example, the matched feature points are expressed as $\{p_{nonref}, p_{ref}\}$ values. The feature detection and matching function 602 can use any suitable technique for identifying and matching feature points, such as ORB feature detection and matching. Various types of feature point detection and matching are known in the art. A first transformation matrix estimation function 604 receives the matched feature points $\{p_{nonref}, p_{ref}\}$ and generates an initial estimate of the transformation matrix. The initial estimate represents an initial guess of the transformation matrix that could be used to transform the features points of the non-reference image to match the features points of the reference image. Various types of transformation matrix estimation techniques are known in the art, such as linear estimation.

The reference and non-reference images and the initial estimate of the transformation matrix are provided to a block search function 606. Unlike the feature detection and matching (which matches feature points), the block search function 606 attempts to match blocks in the reference and non-reference images after at least one of the images has been transformed using the initial estimate of the transformation matrix. This allows the block search to be guided by the identified feature points. In this example, the matched blocks are expressed as $\{q_{nonref}, g_{ref}\}$ values. The block search function 606 can use any suitable technique for identifying and matching blocks.

A second transformation matrix estimation function 608 receives the matched feature points $\{p_{nonref}, p_{ref}\}$ and the matched blocks $\{q_{nonref}, g_{ref}\}$ and generates a final estimate of the transformation matrix H. The final estimate ideally represents the best estimate of the transformation matrix to be used to transform the features points and blocks of the non-reference image to match the features points and blocks of the reference image. Once the non-reference image is transformed using the transformation matrix H, the non-reference image is generally aligned with the reference image. Again, various types of transformation matrix estimation techniques are known in the art, such as linear estimation.

Note that the process shown in FIG. 6 can be repeated for each non-reference image in the image collection 502, typically using the same image from the collection 502 as the reference image. The results from performance of the process in FIG. 6 is ideally a set of images (denoted 504', 506', and 508' below) that are generally aligned with one another. It is possible that one of the images in the set of aligned images still represents the corresponding original image, such as when the image 506' matches the image 506 if the image 506 is used as the reference image during the process 600.

Figure 7:
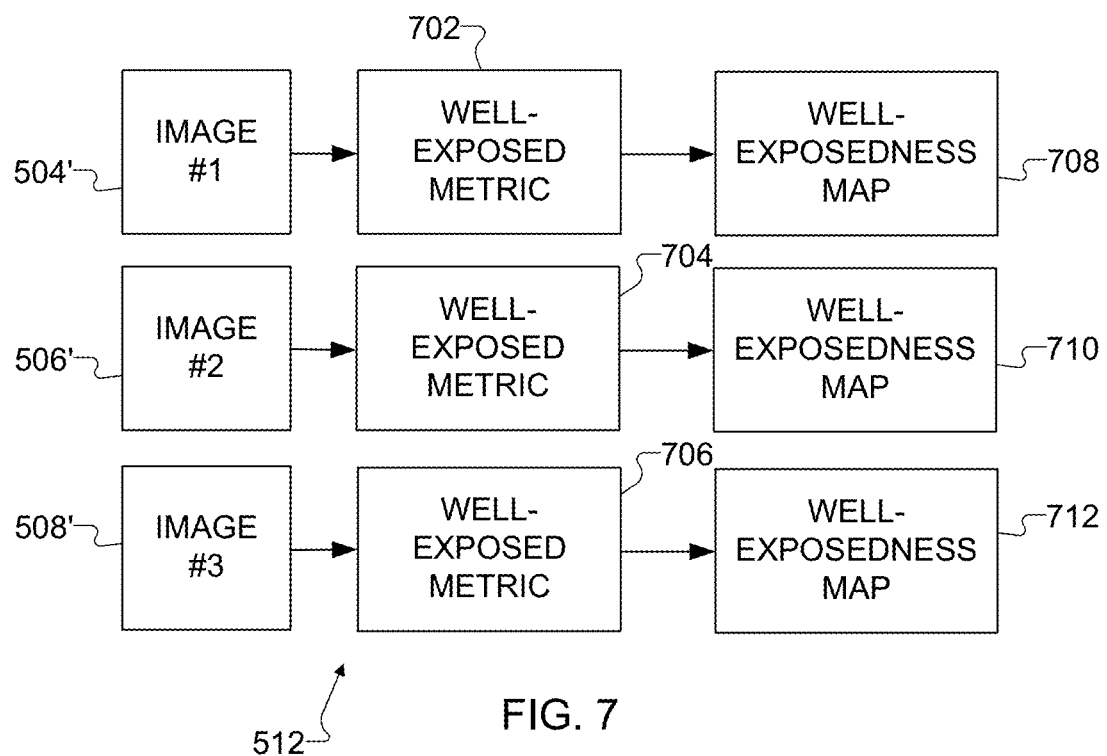
FIGS. 7 and 8 illustrate an example process for an exposure analysis operation in the process of FIG. 5 in accordance with this disclosure.
Figure 8:
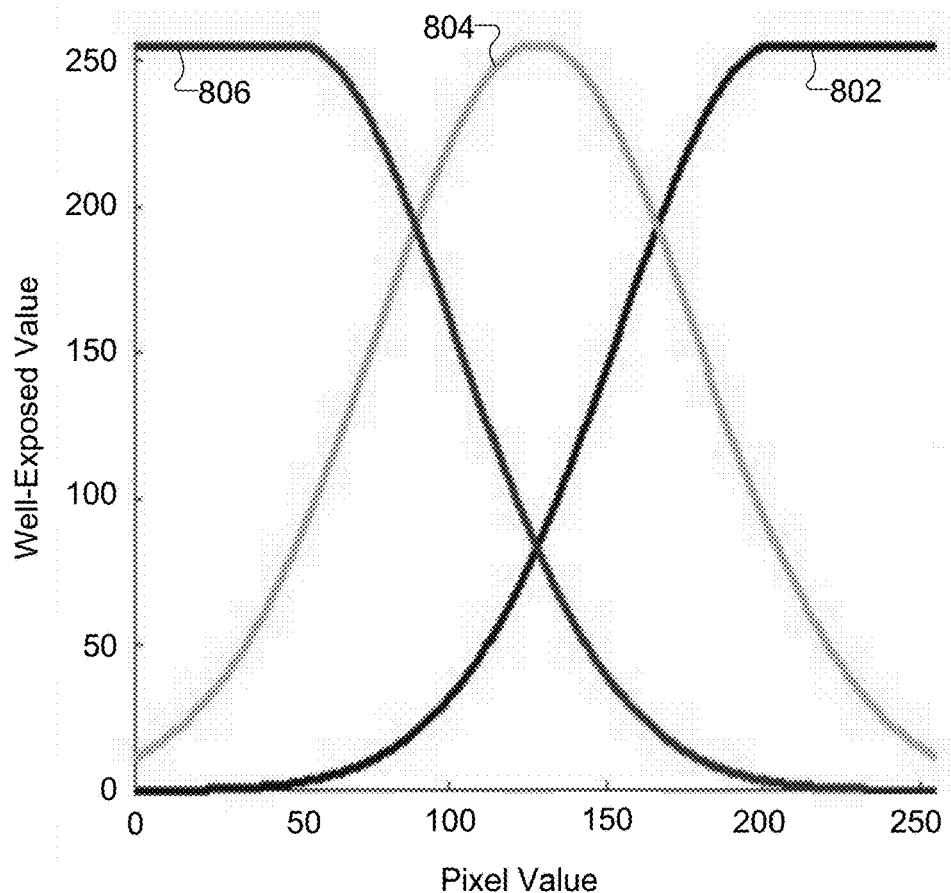

FIGS. 7 and 8 illustrate an example process for an exposure analysis operation 512 in the process 500 of FIG. 5 in accordance with this disclosure. As described above, the exposure analysis operation 512 is used to identify different areas of aligned versions of images captured by the electronic device 101 that are well-exposed and therefore include the most useful and reliable image information. As shown in FIG. 7, different metrics 702, 704, and 706 are applied to the aligned images 504', 506', and 508'. Different metrics 702, 704, and 706 can be used here since the images 504', 506', and 508' are associated with different camera exposures. Thus, different measures can be used to determine whether portions of the different images 504', 506', and 508' are well-exposed. In this way, each image 504', 506', and 508' is converted into a well-exposedness map 708, 710, and 712, respectively. Each well-exposedness map 708, 710, and 712 could represent a grayscale image, where brighter colors represent well-exposed areas of the associated image and darker colors represent over- or under-exposed areas of the associated image.

Examples of the metrics 702, 704, and 706 that could be used here are shown in FIG. 8, where lines 802, 804, and 806 respectively represent the functions applied by the metrics 702, 704, and 706. For each function, the corresponding line 802, 804, or 806 identifies how actual pixel values in an image 504', 506', or 508' are translated into values contained in the well-exposedness map 708, 710, or 712. For example, the line 802 here represents how pixel values in a short-exposure image (such as the image 504') can be converted into corresponding values in the well-exposedness map 708. The line 804 here represents how pixel values in a mid-exposure image (such as the image 506') can be converted into corresponding values in the well-exposedness map 710. The line 806 here represents how pixel values in a long-exposure image (such as the image 508') can be converted into corresponding values in the well-exposedness map 712. Because the pixel values in different images of the same scene can vary in a generally known manner as the camera exposure changes, it is possible to predict which pixel values are more likely to represent well-exposed areas of images captured at different exposures. Note, however, that the functions shown in FIG. 8 are examples only, and other metrics could be used to convert an image into a well-exposedness map.

Figure 9:
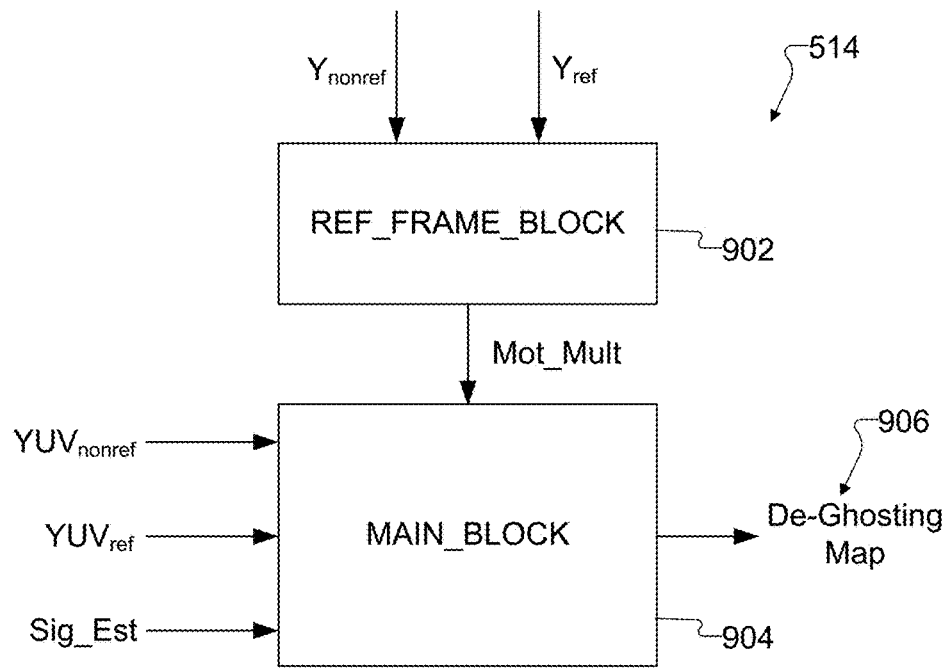

FIGS. 9, 10, 11, 12, and 13 illustrate an example process for an image de-ghosting operation 514 in the process 500 of FIG. 5 in accordance with this disclosure. As described above, the image de-ghosting operation 514 is used to identify motion in aligned versions of images captured by the electronic device 101. As shown in FIG. 9, the image de-ghosting operation 514 generally includes operations performed by a reference frame block 902 and a main block 904. The reference frame block 902 receives luminance (Y) values of a reference image and a non-reference image and generates a motion multiplier (Mot_Mult) for the two images. The motion multiplier controls how aggressively the main block 904 in the image de-ghosting operation 514 will be in terms of rejecting pixels with high difference as motion. The main block 904 receives the motion multiplier, the luminance values of the reference and non-reference images, and chrominance values (U and V) of the reference and non-reference images, along with any desired tuning parameters (such as a noise level estimate denoted Sig_Est). The noise level estimate can be based on the ISO level of the camera during the capture of the images. The main block 904 uses this information to generate a de-ghosting map 906 for the two images. The de-ghosting map 906 (also referred to as a motion map) identifies areas in the two images where motion is occurring and should be removed, thereby identifying the expected motion and noise level in the images.

Figure 10:
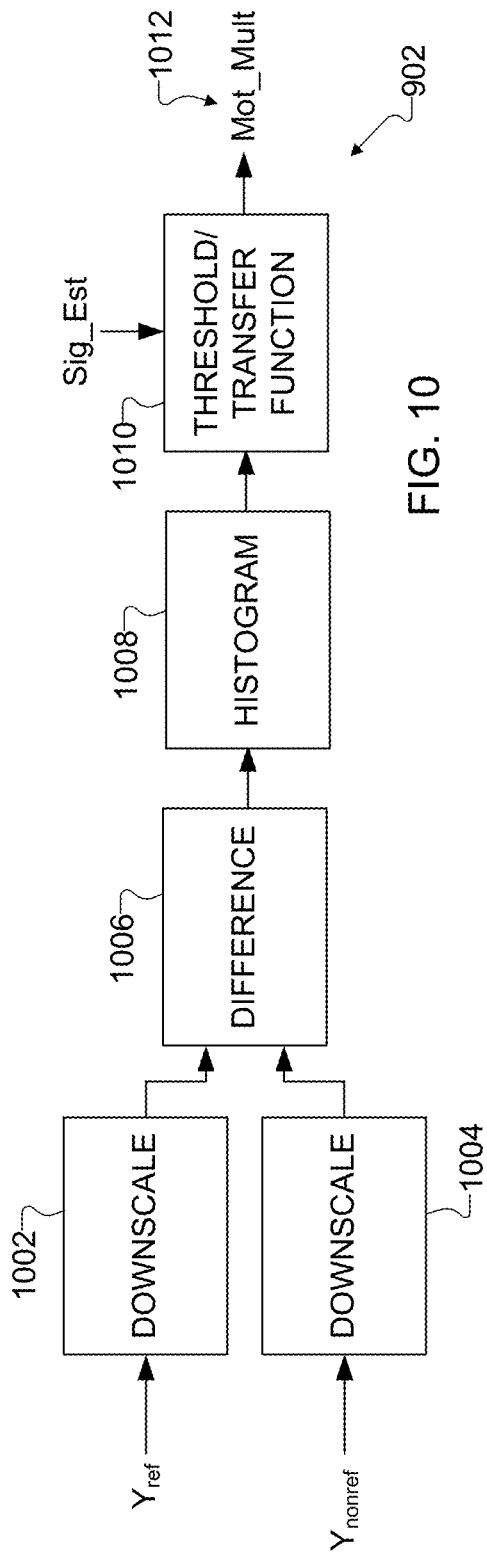

FIG. 10 illustrates an example implementation of the reference frame block 902 in FIG. 9. As shown in FIG. 10, the reference frame block 902 includes downscaling functions 1002 and 1004. The downscaling function 1002 receives the luminance values $Y_{ref}$ of the reference image and downscales the luminance values to produce downscaled luminance values $Y_{ref\_DS}$. Similarly, the downscaling function 1004 receives the luminance values $Y_{nonref}$ of the non-reference image and downscales the luminance values to produce downscaled luminance values $Y_{nonref\_DS}$. The downscaling allows less data to be processed in subsequent operations, which can help to speed up the subsequent operations. Any suitable amount of downscaling can be used, such as by downscaling the data by a factor of four. However, downscaling is not necessarily required here.

A difference function 1006 identifies the differences between the downscaled luminance values (or of the original luminance values) on a pixel-by-pixel basis. Assuming there is no movement between the two images and proper equalization of the images' exposures, the difference function 1006 outputs a difference map identifying only the differences between the images, which (ideally) represent motion within the images. For example, the difference map could have darker pixels indicating little difference between the image pixel values and brighter pixels indicating more differences between the image pixel values. A histogram function 1008 generates a histogram based on the difference map, which quantifies motion statistics within a tile.

A threshold/transfer function 1010 receives the motion statistics from the histogram function 1008 and the noise level estimate Sig_Est. The threshold/transfer function 1010 uses the noise level estimate to identify when differences detected in the images are actually representative of motion in the images. The output of the threshold/transfer function 1010 is a motion multiplier 1012.

Figure 11:
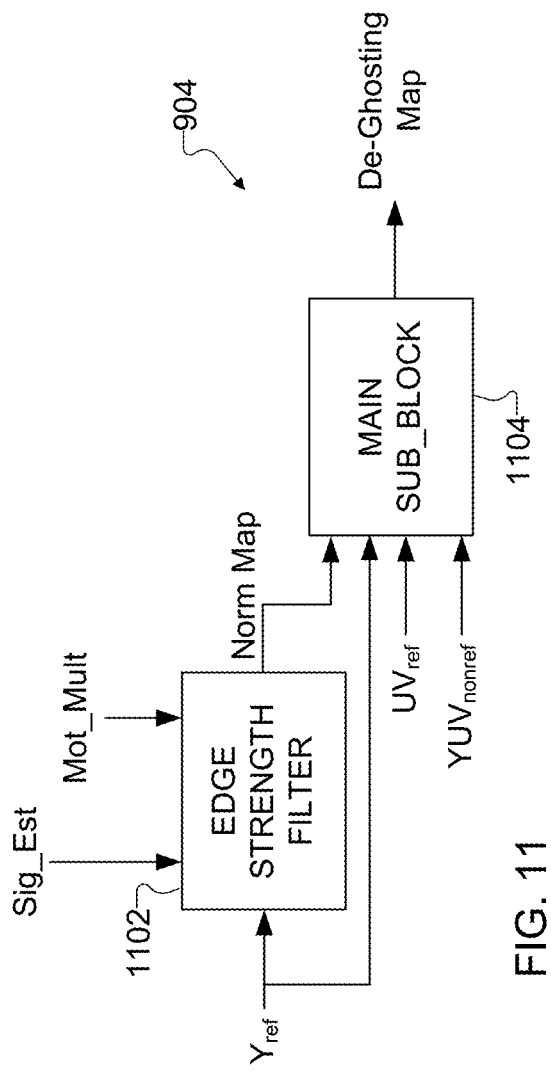

FIG. 11 illustrates an example implementation of the main block 904 in FIG. 9. As shown in FIG. 11, the main block 904 includes an edge strength filter 1102 and a main sub-block 1104. The edge strength filter 1102 receives the luminance values $Y_{ref}$ of the reference image, the noise level estimate Sig_Est, and the motion multiplier Mot_Mult and generates a norm map, which is used by the main sub-block 1104. One example implementation of the edge strength filter 1102 is described below, although other implementations of the edge strength filter 1102 could also be used. The main sub-block 1104 receives the luminance and chrominance values $YUV_{ref}$ and $YUV_{nonref}$ of the reference and non-reference images, along with the norm map. The main sub-block 1104 uses this information to generate the de-ghosting map 906. One example implementation of the main sub-block 1104 is described below, although other implementations of the main sub-block 1104 could also be used.

FIG. 12 illustrates an example implementation of the edge strength filter 1102 of the main block 904 in FIG. 11. As shown in FIG. 12, the edge strength filter 1102 includes a downscaling function 1202, which receives the luminance values $Y_{ref}$ of the reference image and downscales the luminance values to produce downscaled luminance values $Y_{ref\_DS}$. Any suitable downscaling can be used here (such as downscaling by a factor of four), although no downscaling may be needed. The downscaled luminance values $Y_{ref\_DS}$ are passed through a high-pass filter 1204 to produce edge values (denoted $Y_{ESF}$), which represent rough edges in the scene. The edge values are passed through a low-pass filter 1206 to produce filtered edge values (denoted $Filter_{ESF}$), which represent smoothed edges in the scene. The high-pass filter 1204 represents any suitable high-pass filter for filtering pixel values, such as a 3×3 high-pass filter. The low-pass filter 1206 represents any suitable low-pass filter for filtering pixel values, such as a 5×5 low-pass filter.

The filtered edge values are provided to an add/shift/multiply function 1208, which also receives the noise level estimate Sig_Est and the motion multiplier Mot_Mult. The add/shift/multiply function 1208 operates to generate the norm map using this information, where the norm map is used to normalize the motion due to pixel differences within a tile as described below. The add/shift/multiply function 1208 can use the filtered edge values $Filter_{ESF}$, noise level estimate Sig_Est, and motion multiplier Mot_Mult in any suitable manner to generate the norm map. In some embodiments, the add/shift/multiply function 1208 generates the norm map by performing the following calculation, although other suitable calculations could also occur.

$$((Sig\_Est+Filter_{ESF})*Mot\_Multi/4)/16 \quad (1)$$

FIG. 13 illustrates an example implementation of the main sub-block 1104 of the main block 904 in FIG. 11. As shown in FIG. 13, the main sub-block 1104 includes difference functions 1302 and 1304. The difference function 1302 identifies the differences $Y_{diff}$ between the luminance values $Y_{ref}$ and $Y_{nonref}$ of the reference and non-reference images, and the difference function 1304 identifies the differences $U_{diff}$ and $V_{diff}$ between the chrominance values $UV_{ref}$ and $UV_{nonref}$ of the reference and non-reference images. The differences $Y_{diff}$ in the luminance values are provided to an average/downscale function 1306, which averages sets of luminance value differences to downscale the size of the luminance value differences and produce downscaled luminance value differences $Y_{diff\_DS}$. Again, any suitable downscaling can be used here (such as downscaling by a factor of four), although no downscaling may be needed.

A sum/cap function 1308 receives the downscaled luminance value differences $Y_{diff\_DS}$ and the chrominance value differences $U_{diff}$ and $V_{diff}$ and operates to generate the difference map, which identifies the differences between the images. The sum/cap function 1308 can use the downscaled luminance value differences $Y_{diff\_DS}$ and chrominance value differences $U_{diff}$ and $V_{diff}$ in any suitable manner to generate the difference map. In some embodiments, the sum/cap function 1308 generates the difference map by performing the following calculation, although other suitable calculations could also occur.

$$Diff=(Y_{diff\_DS}+(U_{diff}+V_{diff})/2)^2 \quad (2)$$

$$Diff\_map=Diff*(Y_{ref}<Sat\_Thr) \quad (3)$$

where Diff_map represents the difference map pixel values and Sat_Thr represents a saturation threshold.

The difference map is provided to a low-pass filter (LPF)/divide function 1310, which also receives the norm map and two scalar values. One scalar value represents a reference weight Ref_weight, and the other scalar value represents a weight multiplier W_mult. The low-pass filter/divide function 1310 uses the difference map, norm map, and scalar values to generate the de-ghosting map, which identifies areas in the images where motion is occurring. The low-pass filter/divide function 1310 can use the difference map, norm map, and scalar values in any suitable manner to generate the de-ghosting map. In some embodiments, the low-pass filter/divide function 1310 generates the de-ghosting map by calculating the following, although other suitable calculations could also occur.

$$Filt\_Mot=LPF(Diff\_map)/Norm\_map \quad (4)$$

$$Deghost\_map=Ref\_weight-min$$
$$(Ref\_weight \cdot Filt\_Mot*W\_mult) \quad (5)$$

where Deghost_map represents the de-ghosting map pixel values and LPF( ) represents a filtering function. The reference weight Ref_weight here defines the maximum value that the de-ghosting map pixels can obtain. The weight multiplier W_mult here defines the value that the Filt_Mot value is multiplied by in order to identify the amount to subtract from the reference weight Ref_weight when motion is present. Larger values of the weight multiplier W_mult therefore result in larger values subtracted from the reference weight Ref_weight, resulting in more motion being detected.

Note that the process shown in FIGS. 9, 10, 11, 12, and 13 can be repeated for each non-reference image in the collection of aligned images, typically using the same image from the collection as the reference image. The results from performance of the process in FIGS. 9, 10, 11, 12, and 13 is ideally a set of de-ghosting maps 906 that identify all of the motion between the non-reference images and the reference image (or at least all motion exceeding a threshold).

Figure 14:
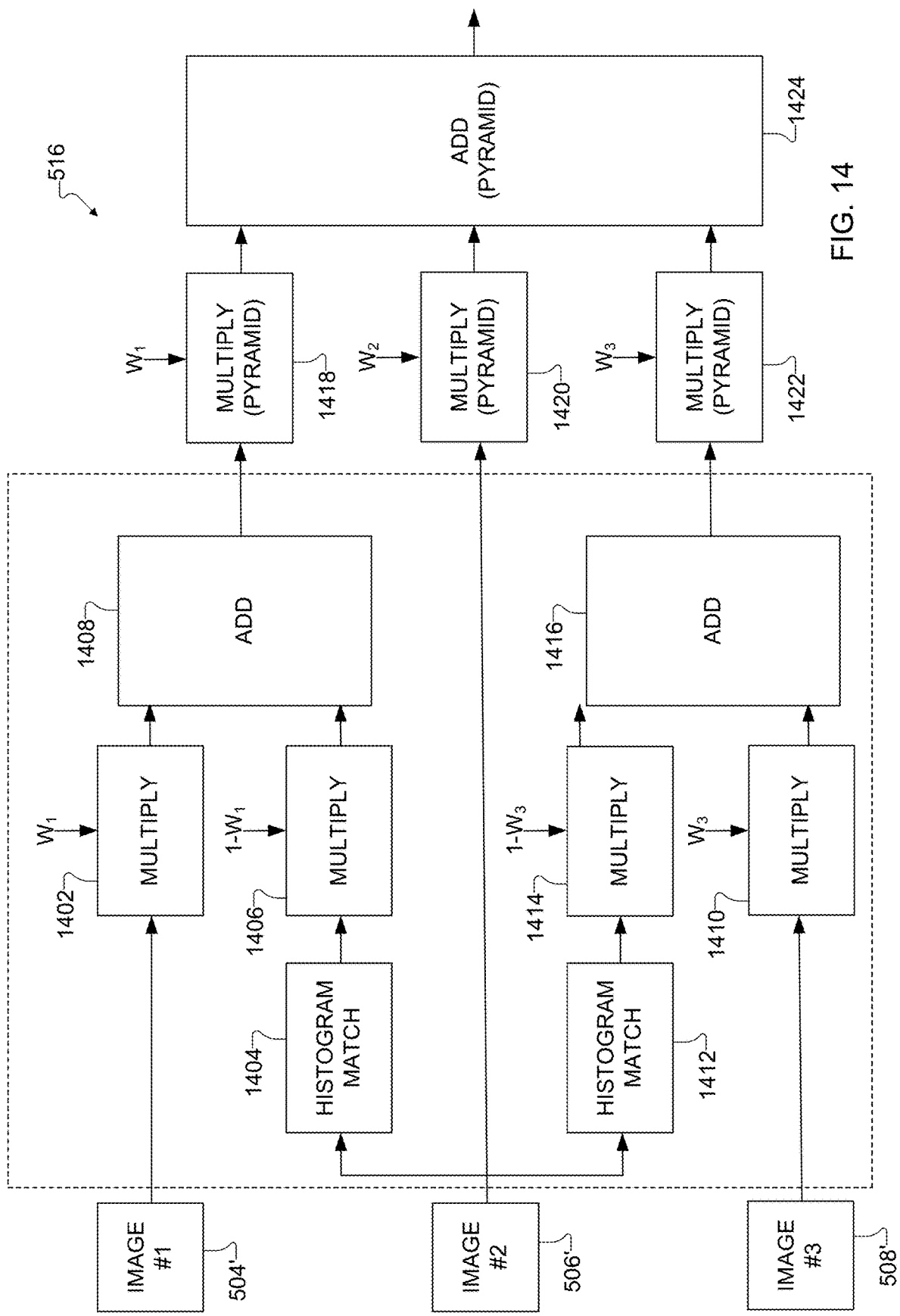
FIGS. 14 and 15 illustrate an example process for an image blending operation in the process of FIG. 5 in accordance with this disclosure.
Figure 15:
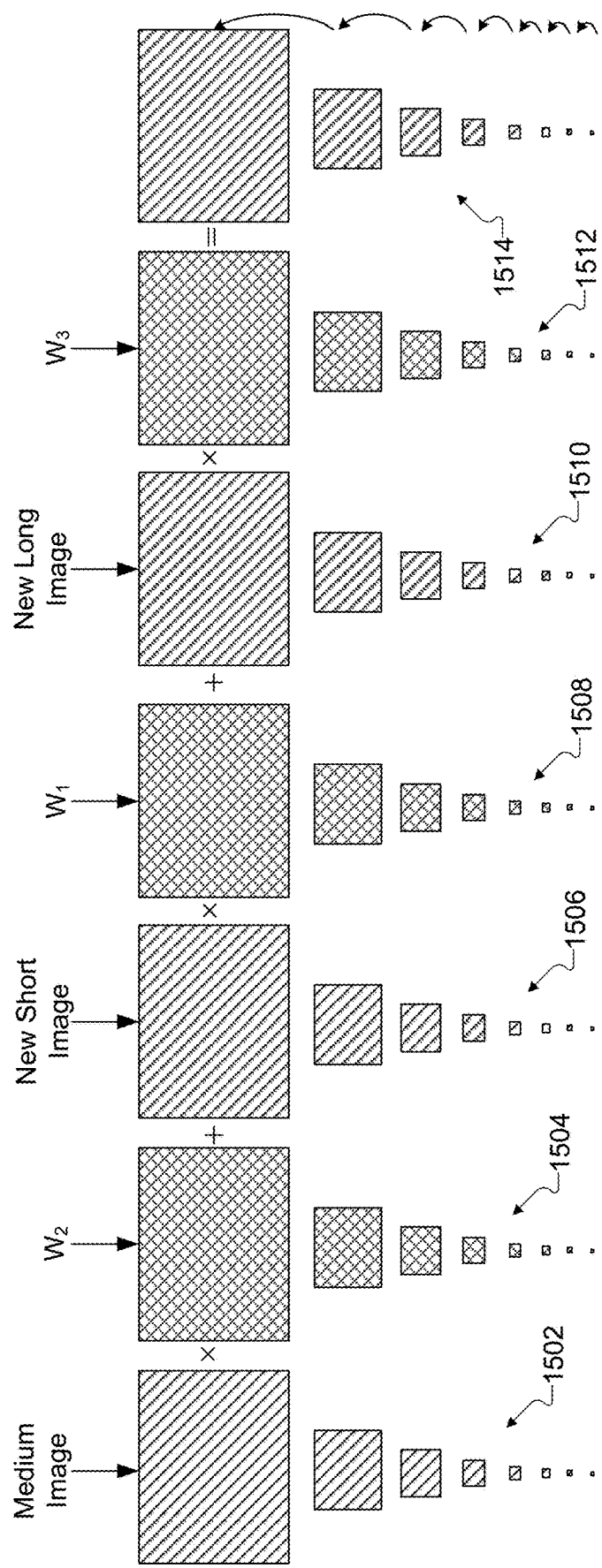

FIGS. 14 and 15 illustrate an example process for an image blending operation 516 in the process 500 of FIG. 5 in accordance with this disclosure. As described above, the image blending operation 516 is used to blend different portions of images captured by the electronic device 101. As shown in FIG. 14, the image blending operation 516 receives different images 504', 506', and 508' (which represent the aligned versions of the images 504, 506, and 508). The image blending operation 516 also receives three blending maps $W_1$, $W_2$, and $W_3$ since there are three images being used here, although other numbers of blending maps can be used if two images or more than three images are being blended. As noted above, the blending maps can be based on or can be a composite of (such as products of) the well-exposedness maps and the de-ghosting maps generated earlier.

One of the images 504', 506', and 508' in FIG. 14 is treated as the reference image. In this example, the image 506' is the reference image, which is consistent with earlier uses of the images 506 as the reference image. The image 504' is provided to a multiplier function 1402, which multiplies the pixels of the image 504' by weights in the blending map $W_1$. A histogram match function 1404 generates a version of the image 506' using the image 504' as a reference. Effectively, a transfer function is applied to the image 506' in order to make the histogram of the image 506' match the histogram of the image 504' as closely as possible. The resulting version of the image 506' is provided to a multiplier function 1406, which multiplies the pixels of the resulting version of the image 506' by weights in a blending map calculated as $1-W_1$ (assuming each weight in the blending map has a value between zero and one, inclusive). The results from the multiplier functions 1402 and 1406 are summed by an adder function 1408. This alpha-blends the image 504' and a version of the image 506', synthesizing a new image that helps to avoid ghosting artifacts by removing motion between the images. Assuming the image 504' has a shorter exposure than the image 506', the new synthesized image may be referred to as a new short-exposure image.

Similarly, the image 508' is provided to a multiplier function 1410, which multiplies the pixels of the image 508' by weights in the blending map $W_3$. A histogram match function 1412 generates a version of the image 506' using the image 508' as a reference. Effectively, a transfer function is applied to the image 506' in order to make the histogram of the image 506' match the histogram of the image 508' as closely as possible. The resulting version of the image 506' is provided to a multiplier function 1414, which multiplies the pixels of the resulting version of the image 506' by weights in a blending map calculated as $1-W_3$ (assuming each weight in the blending map has a value between zero and one, inclusive). This alpha-blends the image 508' and a version of the image 506', synthesizing a new image that helps to avoid ghost artifacts by removing motion between the images. Assuming the image 508' has a longer exposure than the image 506', the new synthesized image may be referred to as a new long-exposure image.

The blended image output from the adder 1408 (such as the new short-exposure image) is provided to a multiplier function 1418, which pyramid multiplies the pixels of the new short-exposure image by the weights in the blending map $W_1$. The image 506' (as the reference image) is provided to a multiplier function 1420, which pyramid multiplies the pixels of the image 506' by the weights in the blending map $W_2$. The blended image output from the adder 1416 (such as the new long-exposure image) is provided to a multiplier function 1422, which pyramid multiplies the pixels of the new long-exposure image by the weights in the blending map $W_3$. This weights the three images according to the three blending maps $W_1$, $W_2$, and $W_3$, respectively. The results are combined in a pyramid add operation 1424, which combines the results to produce a final image. Among other things, the multiplier functions 1418, 1420, and 1422 and the add operation 1424 operate to pyramid blend the images to brighten dark regions (such as the background) and recover saturated regions (such as in the foreground) of the original images 504, 506, and 508.

An example of the pyramid blending of a new short-exposure image, an image 506', and a new long-exposure image is shown in FIG. 15. In this example, the image 506' is referred to as a "medium" image since its exposure is between the exposures of the images 504' and 508'. As shown in FIG. 15, the image 506' is decomposed into a Laplacian pyramid 1502, and the blending map $W_2$ is decomposed into a Gaussian pyramid 1504. The decomposition of an image into a Laplacian pyramid can occur by multiplying the image data with a set of transform functions. The blending map $W_2$ is based on the well-exposedness map and the de-ghosting map associated with the original image 506. The decomposition of a blending map into a Gaussian pyramid can occur by weighting the blending map using Gaussian averages. Each of the pyramids 1502 and 1504 here is a multi-scale pyramid representing an image or blending map at multiple resolution levels or scales. The levels or scales of the pyramids 1502 and 1504 are multiplied together as shown in FIG. 15, which represents the multiplier function 1420. Optionally, at least some of the levels or scales of the pyramids 1502 and 1504 can be multiplied by a halo-control term, which is done for halo suppression.

Similar operations occur for the new short- and long-exposure images. In this example, the new short-exposure image is decomposed into a Laplacian pyramid 1506, and the blending map $W_1$ is decomposed into a Gaussian pyramid 1508. The blending map $W_1$ is based on the well-exposedness map and the de-ghosting map associated with the original image 504. The levels or scales of the pyramids 1506 and 1508 are multiplied together (which represents the multiplier function 1418), and optionally at least some of the levels or scales of the pyramids 1506 and 1508 can be multiplied by a halo-control term for halo suppression. Also in this example, the new long-exposure image is decomposed into a Laplacian pyramid 1510, and the blending map $W_3$ is decomposed into a Gaussian pyramid 1512. The blending map $W_3$ is based on the well-exposedness map and the de-ghosting map associated with the original image 508. The levels or scales of the pyramids 1510 and 1512 are multiplied together (which represents the multiplier function 1422), and optionally at least some of the levels or scales of the pyramids 1510 and 1512 can be multiplied by a halo-control term for halo suppression.

The resulting products of the pyramids 1502 and 1504, pyramids 1506 and 1508, and pyramids 1510 and 1512 are summed at each level or scale (which represents the add operation 1424) to produce a blended image pyramid 1514. The various levels or scales of the blended image pyramid 1514 can then be collapsed or recomposed to produce a blended image of a scene, where the blended image represents a blended version of the new short-exposure image, the image 506', and the new long-exposure image. Ideally, the blended image includes or is based on well-exposed portions of the scene from the image 506' and from the new short- and long-exposure images. This may allow, for example, brighter portions of the background from the image 504' to be combined with well-exposed portions of the foreground in the image 506' in order to produce a blended image with more uniform illumination.

Figure 16:
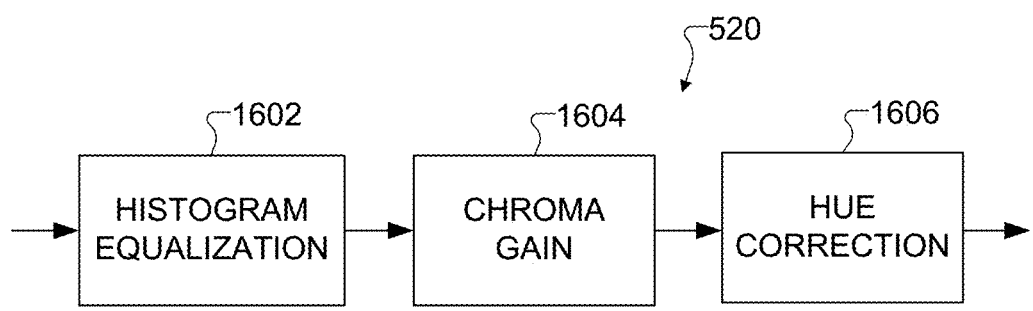
FIG. 16 illustrates an example process for a contrast enhancement operation in the process of FIG. 5 in accordance with this disclosure.

FIG. 16 illustrates an example process for a contrast enhancement operation 520 in the process of FIG. 5 in accordance with this disclosure. As described above, the contrast enhancement operation 520 increases the overall contrast of the blended image while maintaining natural hue within the blended image. As shown in FIG. 16, the contrast enhancement operation 520 includes a histogram equalization function 1602, which generally adapts a blended image produced to a suitable scene. In some embodiments, the histogram equalization function 1602 uses a global version of contrast-limited adaptive histogram equalization (CLAHE) to improve contrast of the blended image in the luminance domain.

In particular embodiments, histogram equalization is applied on top of the tone curve for the blended image, where the parameters to the histogram equalization function 1602 include a clip limit, a minimum value, and a maximum value. The clip limit controls the threshold above which histogram entries are redistributed to other areas of the histogram. In some cases, the clip limit can have a typical useful range between 0.0 and 0.2. The minimum value represents a contrast control parameter defining the percentage below which pixels are clipped at a value of zero. In some cases, the minimum value can have a typical useful range between 0.0 and 0.01. The maximum value represents a contrast control parameter defining the percentage above which pixels are clipped at a value of 255. In some cases, the maximum value can have a typical useful range between 0.99 and 1.0.

The contrast enhancement operation 520 also includes a chroma gain function 1604 and a hue correction function 1606. The chroma gain function 1604 generally operates to identify the gain applied to the luminance values by the histogram equalization function 1602 and to apply the same gain to the chrominance values of the blended image. This can be done to help avoid color desaturation. However, a visible artifact can be created when applying a chroma gain globally in the blended image. In particular, there can be a global shift of hue towards red when applying a chroma gain globally. Hence, the hue correction function 1606 can be applied to correct this global shift. The output of the hue correction function 1606 can represent a final image 522 of a scene being captured using the electronic device 101.

Although FIG. 5 illustrates one example of a process 500 for multi-scale blending of images in a mobile electronic device and FIGS. 6 through 16 illustrate examples of operations in the process 500 of FIG. 5, various changes may be made to FIGS. 5 through 16. For example, while shown as sequences of steps, various operations shown in FIGS. 5 through 16 could overlap, occur in parallel, occur in a different order, or occur any number of times. Also, the specific operations shown in FIGS. 6 through 16 are examples only, and other techniques could be used to perform each of the operations shown in FIGS. 6 through 16.

It should be noted that the operations shown in FIGS. 2 through 16 can be implemented in an electronic device 101 in any suitable manner. For example, in some embodiments, the operations shown in FIGS. 2 through 16 can be implemented or supported using one or more software applications or other software instructions that are executed by the processor 120 of the electronic device 101. In other embodiments, at least some of the operations shown in FIGS. 2 through 16 can be implemented or supported using dedicated hardware components. In general, the operations shown in FIGS. 2 through 16 can be performed using any suitable hardware or any suitable combination of hardware and software/firmware instructions.

It should also be noted that the operations shown in FIGS. 2 through 16 are described above as being performed using a specific implementation of the electronic device 101, but a number of modifications can be made based on the actual electronic device 101 being used. For example, the electronic device 101 could include or use a single camera or multiple cameras. If a single camera is used, multiple images of a scene could be captured sequentially, such as in one or more fast bursts. If multiple cameras are used, it may be possible to capture multiple images concurrently or in an overlapping manner, such as by capturing multiple images of a scene at the same time but with different camera exposures using different cameras. If needed, multiple images of the scene could still be captured sequentially using at least one of the multiple cameras. Assuming the geometry of the multiple cameras is known ahead of time, this geometry can be used to help align the images captured by the cameras or perform other functions. As another example, the electronic device 101 is described above as performing various operations using YUV image data. However, data in other domains (such as RGB data) could also be used or processed. As a third example, the techniques described in this patent document could be combined with conventional HDR image processing algorithms, such as in a software library used by the electronic device 101. This may allow a user of the electronic device 101 to select between different image processing algorithms, such as based on the specific situation or based on user preference.

Figure 17:
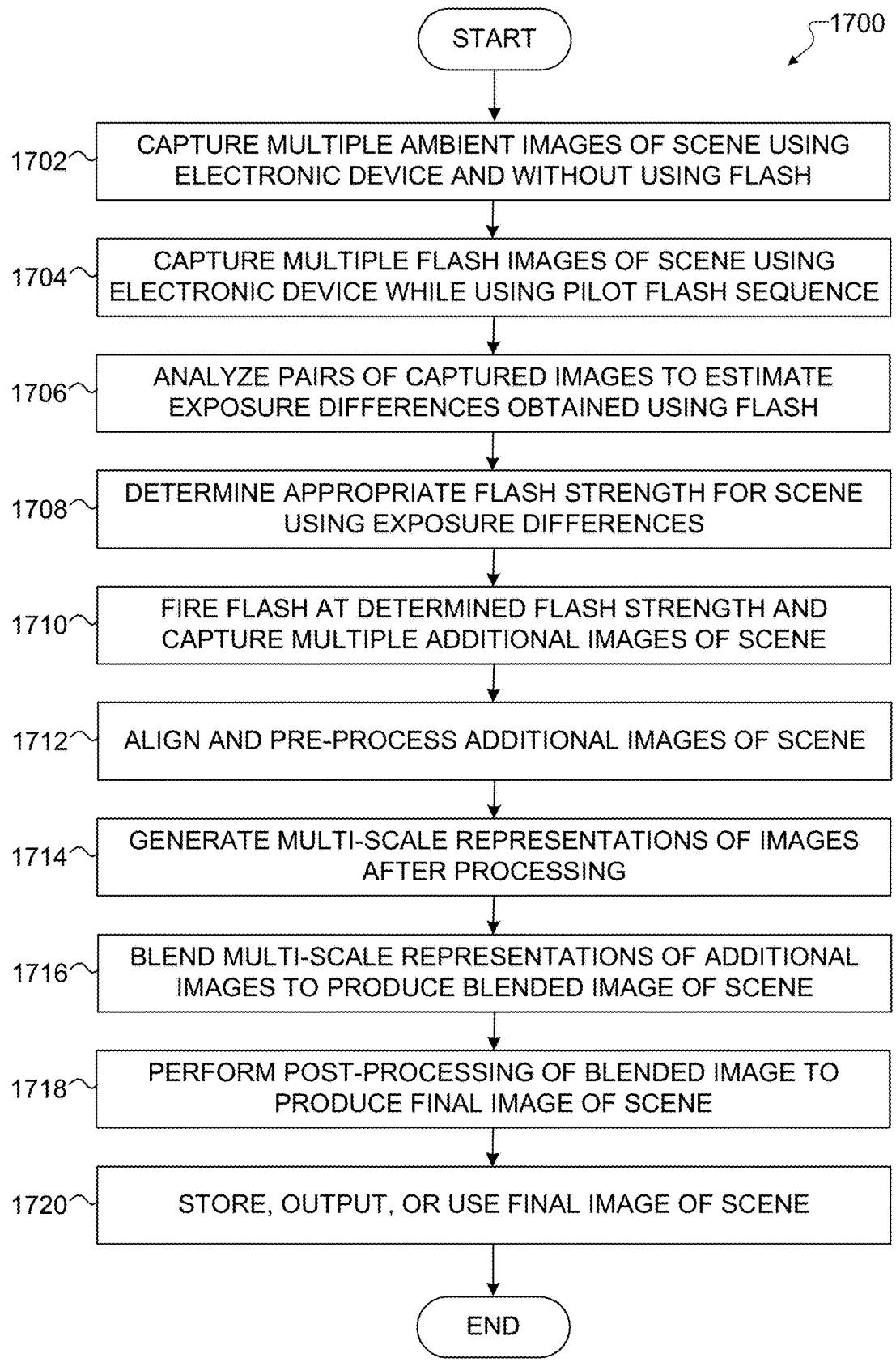
FIG. 17 illustrates an example method for multi-pair image analysis and multi-scale blending in accordance with this disclosure.

FIG. 17 illustrates an example method 1700 for multi-pair image analysis and multi-scale blending in accordance with this disclosure. For ease of explanation, the method 1700 shown in FIG. 17 is described as being performed using the electronic device 101 of FIG. 1 and the techniques shown in FIGS. 2 through 16. However, the method 1700 shown in FIG. 17 could be used with any other suitable electronic device and in any suitable system, and various steps in the method 1700 may or may not occur using the operations and functions shown in FIGS. 2 through 16.

As shown in FIG. 17, multiple ambient images of a scene are captured using an electronic device and without using a flash at step 1702. This could include, for example, the processor 120 of the electronic device 101 receiving a capture request 202 and causing at least one camera of the electronic device 101 to capture the ambient images 206 of the scene. This could also include the processor 120 of the electronic device 101 controlling the camera(s) to use different exposures when capturing the ambient images 206. Multiple flash images of the scene are captured using the electronic device and while using a pilot flash sequence at step 1704. This could include, for example, the processor 120 of the electronic device 101 causing the at least one camera of the electronic device 101 to capture the flash images 210 of the scene. This could also include the processor 120 of the electronic device 101 controlling the flash 190 to produce the pilot flash sequence (possibly at a predefined flash strength) and controlling the camera(s) to use different exposures when capturing the flash images 210.

Multiple pairs of the captured images are analyzed to estimate the exposure differences obtained using the flash at step 1706. This could include, for example, the processor 120 of the electronic device 101 processing multiple pairs of images (each pair including one of the ambient images 206 and one of the flashing images 210 having a common exposure time) to identify the exposure differences between each pair of images. Different pairs of images can be captured using different camera exposures. As a specific example, each pair of images could be processed by dividing the pixel values in the images, converting the quotients into a logarithmic domain, applying a rectifier linear unit operation, averaging the resulting values, and performing an edge-preserving filtering of the averaged values. As another specific example, each pair of images could be processed using an artificial intelligence function (such as a convolutional neural network 406). An appropriate flash strength for the scene is identified using the exposure differences at step 1708. This could include, for example, the processor 120 of the electronic device 101 mapping the identified exposure differences to the appropriate flash strength. As noted above, the mapping can be based on a number of factors.

The flash of the electronic device is fired at the determined flash strength and additional images of the scene are captured using the electronic device at step 1710. This could include, for example, the processor 120 of the electronic device 101 controlling the flash 190 to fire at the appropriate flash strength determined earlier. This could also include the processor 120 of the electronic device 101 causing the at least one camera of the electronic device 101 to capture the additional images 504, 506, and 508 of the scene. The additional images 504, 506, and 508 can be captured using a different exposure but the same common flash strength. The additional images are aligned and pre-processed at step 1712. This could include, for example, the processor 120 of the electronic device 101 aligning the additional images 504, 506, and 508 using feature point detection and matching and block searching. This could also include the processor 120 of the electronic device 101 performing exposure analysis and de-ghosting of the aligned images 504', 506', and 508'.

The aligned and pre-processed images are then blended. In this example, the blending occurs by generating multi-scale representations of images after alignment and processing at step 1714, and the multi-scale representations are blended to produce a blended image of the scene at step 1716. This could include, for example, the processor 120 of the electronic device 101 decomposing one of the images selected as a reference (such as the image 506") into a Laplacian pyramid and decomposing the associated blending map into a Gaussian pyramid. This could also include the processor 120 of the electronic device 101 generating one or more synthesized images based on one or more processed images (such as new versions of the image 506" based on the images 504" and 508"), decomposing the synthesized image(s) into one or more Laplacian pyramids, and decomposing the associated blending map(s) into one or more Gaussian pyramids. This can further include the processor 120 of the electronic device 101 multiplying each Laplacian pyramid by the associated Gaussian pyramid, applying any desired halo correction factors, and summing the results at each level of the multi-scale representations. In addition, this can include the processor 120 of the electronic device 101 collapsing to summed results to produce a blended image of the scene. Ideally, the blended image of the scene has a more uniform illumination compared to any of the original images.

Any desired post-processing of the blended image occurs at step 1718. This could include, for example, the processor 120 of the electronic device 101 performing an edge-enhanced noise filtering function 518 and/or a contrast enhancement operation 520 on the blended image of the scene. The output of the post-processing is a final image of the scene, which can be stored, output, or used in some manner at step 1720. This could include, for example, the processor 120 of the electronic device 101 displaying the final image of the scene on the display 160 of the electronic device 101. This could also include the processor 120 of the electronic device 101 saving the final image of the scene to a camera roll stored in a memory 130 of the electronic device 101. This could further include the processor 120 of the electronic device 101 attaching the final image of the scene to a text message, email, or other communication to be transmitted from the electronic device 101. Of course, the final image of the scene could be used in any other or additional manner.

Although FIG. 17 illustrates one example of a method 1700 for multi-pair image analysis and multi-scale blending, various changes may be made to FIG. 17. For example, while shown as a series of steps, various steps in FIG. 17 could overlap, occur in parallel, occur in a different order, or occur any number of times. Also, it is not necessary that the techniques for multi-pair image analysis described above be used with the techniques for multi-scale blending described above. It is possible, for instance, to perform the multi-pair image analysis to identify and fire the flash 190 without then performing the multi-scale blending. Similarly, it is possible to perform the multi-scale blending based on images captured using a flash strength that is not based on the multi-pair image analysis.

Figure 18:
FIGS. 18, 19, 20, and 21 illustrate example results that can be obtained using multi-pair image analysis and multi-scale blending in accordance with this disclosure.
Figure 19:
Figure 20:

FIGS. 18, 19, 20, and 21 illustrate example results that can be obtained using multi-pair image analysis and multi-scale blending in accordance with this disclosure. In FIG. 18, an image 1800 of a scene that includes a darker foreground with an object (a teddy bear resting on a table) and a brighter background is captured, where no flash is used. As can be seen here, the brighter background is generally well-illuminated, while the foreground with the object is dark and under-exposed. In FIG. 19, an image 1900 of the same scene is captured, but this time a standard flash is used. As can be seen here, the brighter background is now darker, while the foreground with the object is very bright and likely considered over-exposed. In FIG. 20, an image 2000 of the same scene is captured, but this time a standard flash and standard HDR image processing are used. As can be seen here, the background is still bright, and slight improvements have been made in illuminating the foreground. Unfortunately, the foreground still has significant illumination differences with the background.

Figure 21:

In FIG. 21, an image 2100 of the same scene is captured using the approaches described above for multi-pair image analysis and multi-scale blending. As can be seen here, the background of the scene is still well-illuminated, but the background has not been darkened as was done in the standard flash image 1900 in FIG. 19. Moreover, the foreground of the scene has been brightened compared to the original non-flash image 1800 in FIG. 18, but the foreground is not over-exposed as in the standard flash image 1900 in FIG. 19. Also, the foreground of the scene has a more consistent illumination compared to the background, which is not achieved using the standard HDR image processing for the image 2000 in FIG. 20. The image 2100 is therefore more aesthetically pleasing overall compared to any of the images 1800, 1900, and 2000.

Although FIGS. 18, 19, 20, and 21 illustrate examples of results that can be obtained using multi-pair image analysis and multi-scale blending, various changes may be made to FIGS. 18, 19, 20, and 21. For example, FIGS. 18, 19, 20, and 21 are merely meant to illustrate one example of the type of results that could be obtained using the approaches described in this disclosure. Obviously, standard, flash, and HDR images can vary widely, and the results obtained using the approaches described in this patent document can also vary widely depending on the circumstances.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    capturing multiple ambient images of a scene using at least one camera of an electronic device and without using a flash of the electronic device;
    capturing multiple flash images of the scene using the at least one camera of the electronic device and during firing of a pilot flash sequence using the flash;
    analyzing multiple pairs of images to estimate exposure differences obtained using the flash, wherein each pair of images includes one of the ambient images and one of the flash images that are both captured using a common camera exposure, and wherein different pairs of images are captured using different camera exposures;
    determining a flash strength for the scene based on the estimate of the exposure differences; and
    firing the flash based on the determined flash strength.

2. The method of claim 1, wherein analyzing each pair of images comprises at least one of:
    identifying exposure differences between the ambient image and the flash image in the pair at a pixel level;
    identifying exposure differences between the ambient image and the flash image in the pair for a foreground and a background of the images; and
    identifying exposure differences between the ambient image and the flash image in the pair for one or more objects in the images.

3. The method of claim 1, wherein determining the flash strength for the scene comprises mapping the identified exposure differences to the flash strength.

4. The method of claim 1, further comprising:
    capturing additional images of the scene using the at least one camera of the electronic device, at least some of the additional images captured at the determined flash strength and using different camera exposures; and
    blending the additional images to produce a blended image of the scene.

5. The method of claim 4, wherein blending the additional images comprises:
    aligning the additional images;
    generating exposure maps for the aligned additional images using different metrics for the different camera exposures of the additional images; and
    generating motion maps for the aligned additional images or for equalized versions of the aligned additional images; and
    wherein the blended image is produced using the exposure maps, synthesized images based on the aligned images, and the motion maps.

6. The method of claim 4, wherein:
    the additional images include first, second, and third additional images; and
    blending the additional images comprises:
        blending a version of the first additional image and a first histogram-matched version of the second additional image to produce a fourth additional image;
        blending a version of the third additional image and a second histogram-matched version of the second additional image to produce a fifth additional image; and
        blending the second, fourth, and fifth additional images to produce the blended image.

7. The method of claim 4, wherein:
    the blended image includes at least one object in the scene or a foreground of the scene illuminated using the determined flash strength; and
    the at least one object in the scene or the foreground of the scene and a background of the scene have a more uniform illumination than in the additional images of the scene.

8. An electronic device comprising:
    at least one camera;
    a flash; and
    at least one processing device configured to:
        capture multiple ambient images of a scene using the at least one camera and without using the flash;
        capture multiple flash images of the scene using the at least one camera and during firing of a pilot flash sequence using the flash;
        analyze multiple pairs of images to estimate exposure differences obtained using the flash, wherein each pair of images includes one of the ambient images and one of the flash images that are both captured using a common camera exposure, and wherein different pairs of images are captured using different camera exposures;
        determine a flash strength for the scene based on the estimate of the exposure differences; and
        fire the flash based on the determined flash strength.

9. The electronic device of claim 8, wherein, to analyze each pair of images, the at least one processing device is configured to at least one of:
    identify exposure differences between the ambient image and the flash image in the pair at a pixel level;
    identify exposure differences between the ambient image and the flash image in the pair for a foreground and a background of the images; and
    identify exposure differences between the ambient image and the flash image in the pair for one or more objects in the images.

10. The electronic device of claim 8, wherein, to determine the flash strength for the scene, the at least one processing device is configured to map the identified exposure differences to the flash strength.

11. The electronic device of claim 8, wherein the at least one processing device is further configured to:
    capture additional images of the scene using the at least one camera, at least some of the additional images captured at the determined flash strength and using different camera exposures; and
    blend the additional images to produce a blended image of the scene.

12. The electronic device of claim 11, wherein, to blend the additional images, the at least one processing device is configured to:
    align the additional images;
    generate exposure maps for the aligned additional images using different metrics for the different camera exposures of the additional images; and
    generate motion maps for the aligned additional images or for equalized versions of the aligned additional images; and
    wherein, to produce the blended image, the at least one processing device is configured to use the exposure maps, synthesized images based on the aligned images, and the motion maps.

13. The electronic device of claim 11, wherein:
the additional images include first, second, and third additional images; and
to blend the additional images, the at least one processing device is configured to:
blend a version of the first additional image and a first histogram-matched version of the second additional image to produce a fourth additional image;
blend a version of the third additional image and a second histogram-matched version of the second additional image to produce a fifth additional image; and
blend the second, fourth, and fifth additional images to produce the blended image.

14. The electronic device of claim 11, wherein:
the blended image includes at least one object in the scene or a foreground of the scene illuminated using the determined flash strength; and
the at least one object in the scene or the foreground of the scene and a background of the scene have a more uniform illumination than in the additional images of the scene.

15. A non-transitory machine-readable medium containing instructions that when executed cause at least one processor of an electronic device to:
capture multiple ambient images of a scene using at least one camera of the electronic device and without using a flash of the electronic device;
capture multiple flash images of the scene using the at least one camera of the electronic device and during firing of a pilot flash sequence using the flash;
analyze multiple pairs of images to estimate exposure differences obtained using the flash, wherein each pair of images includes one of the ambient images and one of the flash images that are both captured using a common camera exposure, and wherein different pairs of images are captured using different camera exposures;
determine a flash strength for the scene based on the estimate of the exposure differences; and
fire the flash based on the determined flash strength.

16. The non-transitory machine-readable medium of claim 15, wherein the instructions that when executed cause the processor to analyze each pair of images comprise instructions that when executed cause the processor to at least one of:
identify exposure differences between the ambient image and the flash image in the pair at a pixel level;
identify exposure differences between the ambient image and the flash image in the pair for a foreground and a background of the images; and
identify exposure differences between the ambient image and the flash image in the pair for one or more objects in the images.

17. The non-transitory machine-readable medium of claim 15, wherein the instructions when executed further cause the processor to:
capture additional images of the scene using the at least one camera, at least some of the additional images captured at the determined flash strength and using different camera exposures; and
blend the additional images to produce a blended image of the scene.

18. The non-transitory machine-readable medium of claim 17, wherein the instructions that when executed cause the processor to blend the additional images comprise instructions that when executed cause the processor to:
align the additional images;
generate exposure maps for the aligned additional images using different metrics for the different camera exposures of the additional images; and
generate motion maps for the aligned additional images or for equalized versions of the aligned additional images; and
wherein the instructions that when executed cause the processor to produce the blended image comprise instructions that when executed cause the processor to use the exposure maps, synthesized images based on the aligned images, and the motion maps.

19. The non-transitory machine-readable medium of claim 17, wherein:
the additional images include first, second, and third additional images; and
the instructions that when executed cause the processor to blend the additional images comprise instructions that when executed cause the processor to:
blend a version of the first additional image and a first histogram-matched version of the second additional image to produce a fourth additional image;
blend a version of the third additional image and a second histogram-matched version of the second additional image to produce a fifth additional image; and
blend the second, fourth, and fifth additional images to produce the blended image.

20. The non-transitory machine-readable medium of claim 17, wherein:
the blended image includes at least one object in the scene or a foreground of the scene illuminated using the determined flash strength; and
the at least one object in the scene or the foreground of the scene and a background of the scene have a more uniform illumination than in the additional images of the scene.

* * * * *